US012806621B2

(12) United States Patent
Dubrovsky et al.

(10) Patent No.: US 12,806,621 B2
(45) Date of Patent: Nov. 24, 2026

(54) APPARATUS AND METHODS FOR CONTROLLING ASSAY STEPS WITHIN AN ASSAY USING A PLURALITY OF ACTIVE FLOW COMPONENTS

(71) Applicant: SiPhox, Inc., Burlington, MA (US)

(72) Inventors: Michael Dubrovsky, Somerville, MA (US); Armando Paredes, Lincoln, MA (US); Diedrik Rene Vermeulen, Arlington, MA (US)

(73) Assignee: SiPhox, Inc., Burlington, MA (US)

( * ) Notice: Subject to any disclaimer, the term of this patent is extended or adjusted under 35 U.S.C. 154(b) by 672 days.

(21) Appl. No.: 18/199,224

(22) Filed: May 18, 2023

(65) Prior Publication Data

US 2023/0372934 A1 Nov. 23, 2023

Related U.S. Application Data

(60) Provisional application No. 63/343,214, filed on May 18, 2022.

(51) Int. Cl.
*B01L 3/00* (2006.01)

(52) U.S. Cl.
CPC ....... *B01L 3/50273* (2013.01); *B01L 2200/16* (2013.01); *B01L 2300/0663* (2013.01); *B01L 2300/0867* (2013.01); *B01L 2400/0478* (2013.01)

(58) Field of Classification Search
CPC ............. B01L 3/50273; B01L 2200/16; B01L 2300/0663; B01L 2300/0867; B01L 2400/0478
USPC .................................................. 422/503, 500
See application file for complete search history.

(56) References Cited

U.S. PATENT DOCUMENTS

| | | | | |
|---|---|---|---|---|
| 7,858,048 | B2 | 12/2010 | Gilligan | |
| 10,865,440 | B2 | 12/2020 | Eberhart | |
| 11,579,107 | B2 | 2/2023 | Klein | |
| 2008/0273918 | A1* | 11/2008 | Linder | G01N 33/5302 403/31 |
| 2018/0080925 | A1* | 3/2018 | Benam | B01L 3/502761 |

OTHER PUBLICATIONS

Van Herren, Henne, Lab Chip, 2012, 12, 1022-1025. (Year: 2012).*

* cited by examiner

*Primary Examiner* — Christine T Mui
(74) *Attorney, Agent, or Firm* — Caldwell LLC

(57) ABSTRACT

An apparatus for controlling assay steps using active flow components, the apparatus includes a microfluidic device containing a reservoir configured to contain a fluid and microfluidic channels connected to the reservoir, wherein the microfluidic channels are configured to create a microfluidic environment for an assay, active flow components, a sensor device configured to detect a sensed property of the fluid, and an external device connected to the microfluidic device including actuators, wherein the actuators are configured to connect the active flow components using a mechanical interface and initiate active flow processes corresponds to assay steps of the assay based on the active flow components, and a reading device configured to read the sensed property of the fluid from the sensor device, wherein the active flow components are configured to flow the fluid bi-directionally through the sensor device within the microfluidic environment based on active flow processes.

20 Claims, 15 Drawing Sheets

APPARATUS AND METHODS FOR CONTROLLING ASSAY STEPS WITHIN AN ASSAY USING A PLURALITY OF ACTIVE FLOW COMPONENTS

CROSS-REFERENCE TO RELATED APPLICATIONS

This application claims the benefit of priority of U.S. Provisional Patent Application Ser. No. 63/343,214, filed on May 18, 2022, and titled "MICROFLUIDIC CARTRIDGE WITH A PLURALITY OF BUILT-IN SYRINGES FOR CONTROLLING ASSAY STEPS," which is incorporated by reference herein in its entirety.

FIELD OF THE INVENTION

The present invention generally relates to the field of performing microfluidics-based biochemical assays. In particular, the present invention is directed to an apparatus and methods for controlling assay steps within an assay using a plurality of active flow components.

BACKGROUND

In order to perform multiple complex assays multiple steps with different reagents, a microfluidic cartridge is needed. The cartridge design must be flexible in its functions to allow for precise timing on steps, allowance on fluid exposure to other reagents, incubation period and furthermore detection on reactions.

SUMMARY OF THE DISCLOSURE

In an aspect, an apparatus for controlling assay steps within an assay using a plurality of active flow components is described. The apparatus includes a microfluidic device containing a plurality of microfluidic features, wherein the plurality of microfluidic features includes at least a reservoir configured to contain at least a fluid and a plurality of microfluidic channels connected to the at least a reservoir, wherein the plurality of microfluidic channels is configured to create a microfluidic environment for an assay containing a plurality of assay steps, at least two active flow components fluidically connected to the plurality of microfluidic features, at least a sensor device, wherein the at least a sensor device is configured to be in sensed communication with the at least a fluid and detect at least a sensed property of the at least a fluid, and an external device connected to the microfluidic device using at least an alignment feature, wherein the external device includes at least two actuators, wherein the at least two actuators are configured to connect the at least two active flow components using at least a mechanical interface and initiate a plurality of active flow processes corresponds to the plurality of assay steps as a function of the at least two active flow components, and at least a reading device communicatively connected to the at least a sensor device, wherein the at least a reading device is configured to read the at least a sensed property of the at least a fluid from the at least a sensor device, wherein the at least two active flow components are configured to flow the at least a fluid bidirectionally through the at least a sensor device within the microfluidic environment as a function of the plurality of active flow processes.

In another aspect, a method for controlling assay steps within an assay using a plurality of active flow components is described. The method includes creating, by a microfluidic device containing a plurality of microfluidic features, a microfluidic environment for an assay containing a plurality of assay steps, wherein the plurality of microfluidic features includes at least a reservoir configured to contain at least a fluid and a plurality of microfluidic channels connected to the at least a reservoir, initiating, by at least two actuators within an external device, a plurality of active flow processes corresponds to a plurality of assay steps as a function of at least two active flow components fluidically connected to the plurality of microfluidic features, wherein the at least two actuators are connected to the at least two active flow components using at least a mechanical interface and the external device is connected to the microfluidic device using at least an alignment feature, flowing, by the at least two active flow components, the at least a fluid bidirectionally through at least a sensor device within the microfluidic environment as a function of the plurality of active flow process, detecting, by the at least a sensor device, at least a sensed property of the at least a fluid, and reading, by a reading device of the external device, the at least a sensed property of the at least a fluid from the at least a sensor device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for controlling assay steps within an assay using a plurality of active flow components. In an embodiment, apparatus includes a microfluidic device containing at least a reservoir and a plurality of microfluidic channels connected to the at least a reservoir configured to create a microfluidic environment for an assay with a plurality of assay steps.

Aspects of the present disclosure allow for flow of at least a fluid within the microfluidic environment. Aspects of the present disclosure can also be used to detect at least a sensed property of the at least a fluid. This is so, at least in part, because the apparatus includes at least two active flow components fluidically connected to the plurality of microfluidic features configured to flow the at least a fluid bidirectionally through at least a sensor device within the microfluidic environment as a function of a plurality of active flow processes initiated by at least two actuators connected to the at least two active flow components using at least a mechanical interface. In other cases, apparatus further includes a passive flow component configured to flow the at least a fluid unidirectionally through the at least a sensor device within the microfluidic environment as a function of a passive flow process.

Aspects of the present disclosure allow for reading the at least a sensed property using a reading device communicatively connected to the at least a sensor device. Exemplary embodiments illustrating aspects of the present disclosure are described below in the context of several specific examples.

Figure 1:
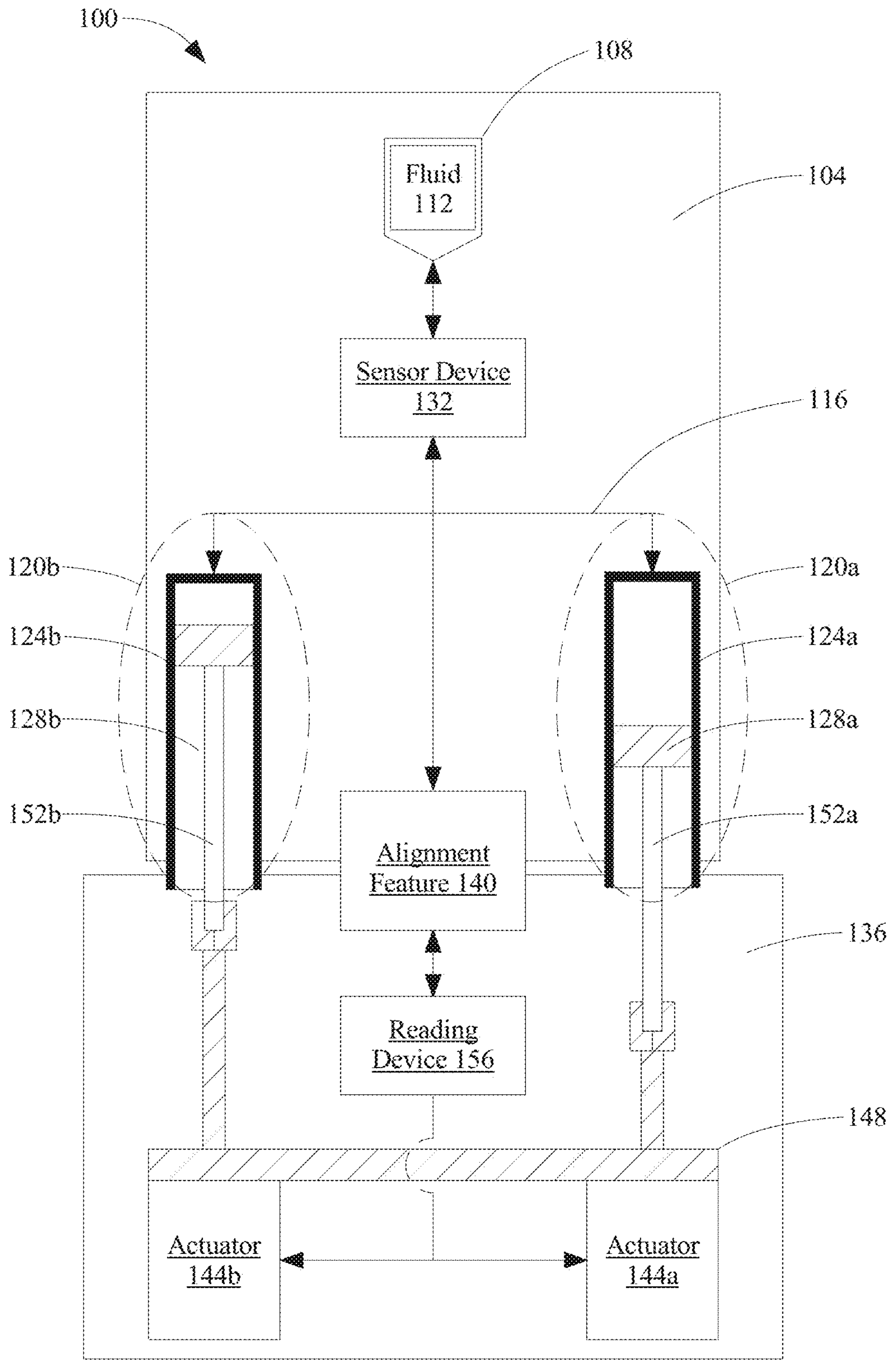
FIG. 1 is a diagram showing an exemplary embodiment of apparatus for controlling assay steps within an assay using a plurality of active flow components.

Referring now to FIG. 1, an exemplary embodiment of an apparatus 100 for controlling assay steps within an assay using a plurality of active flow components is illustrated. As used in this disclosure, an "assay" is an investigative procedure or test used to determine the presence, absence, quantity, or activity of a target substance (known as an analyte) in a sample. In some cases, analyte may include glucose, proteins, hormones, antibodies, and the like. Additional disclosures related to analyte may be found in International Patent Application No PCT/US2022/037767, filed on Jul. 20, 2022, entitled as "WEARABLE BIOSENSORS FOR SEMI-INVASIVE, REAL-TIME MONITORING OF ANALYTES, AND RELATED METHODS AND APPARATUS," the entirety of which is incorporated herein by reference. In an embodiment, any assay described in this disclosure (e.g., immunoassay, biochemical assay) may be performed, using apparatus 100 at a microfluidic scale. In a non-limiting example, apparatus 100 may be configured to perform a microfluidic-based biochemical assay, wherein the microfluidic-based biochemical assay is a biochemical assay (i.e., assay that measures the activity, function, or quantity of a specific enzyme, protein, or other biomolecules in a sample) on small volumes (i.e., in unit of ml or nl) of fluids. "Assay steps," as described herein, refers to a specific stage or action within assay protocol that contributes to the overall process of detecting, measuring, or analyzing the target analyte in a sample. In some cases, assay steps may be performed in a sequential or defined order; for instance, and without limitation, assay steps may include sample preparation, reagent preparation, incubation, washing, detection, reading, and the like. In a non-limiting example, assay/assay steps may be consistent with any assay/processing steps as described in U.S. patent application Ser. No. 18/199,171, filed on May 18, 2023, filed and entitled "APPARATUS AND METHODS FOR DETECTING AN ANALYTE," the entirety of which is incorporated herein by reference.

With continued reference to FIG. 1, apparatus 100 includes a microfluidic device 104. As used in this disclosure, a "microfluidic device" is a device that is configured to act upon fluids at a small scale, such as without limitation a sub-millimeter scale. At small scales, surface forces may dominate volumetric forces. In a non-limiting example, microfluidic device may be consistent with any microfluidic device described in U.S. patent application Ser. No. 17/859,932, filed on Jul. 7, 2022, entitled "SYSTEM AND METHODS FOR FLUID SENSING USING PASSIVE FLOW," the entirety of which is incorporated herein by reference.

With continued reference to FIG. 1, microfluidic device 104 includes a plurality of microfluidic features. As used in this disclosure, a "microfluidic feature" is a structure within microfluidic device 104 that is designed and/or configured to manipulate one or more fluids at micro scale. In some cases, microfluidic feature 108 may enable a precise manipulation of fluids and samples in a controlled and/or reproducible manner within microfluidic device 104. In some embodiments, microfluidic feature 108 of microfluidic device 104 may be designed and arranged based on particular needs of a given microfluidic-based biochemical assay. In other embodiments, microfluidic feature 108 of microfluidic device 104 may be varied depending on the type of the at least a fluid being used, that is directly contact with microfluidic feature 108. In a non-limiting example, attributes of microfluidic feature 108 such as, without the size and/or shape of the substrate may be determined as a function of specific assay protocols. In a non-limiting example, plurality of microfluidic features 108 may be consistent with any microfluidic feature as described in U.S. patent application Ser. No. 18/121,712, filed on Mar. 15, 2023, entitled "APPARATUS AND METHODS FOR PERFORMING MICROFLUIDIC-BASED BIOCHEMICAL ASSAYS," the entirety of which is incorporated herein by reference.

With continued reference to FIG. 1, plurality of microfluidic features of microfluidic device 104 includes at least a reservoir 108. At least a reservoir 108 may be configured to contain at least a fluid 112. In a non-limiting example, at least a fluid 112 may include a sample fluid to be analyzed from a subject; for instance, and without limitation, at least a reservoir 108 may contain a blood sample taken from a patient. Alternatively, or additionally, at least a fluid 112 may include one or more suspensions and/or solutions of reagents, molecules, or other items to be analyzed and/or utilized, including without limitation monomers such as individual nucleotides, amino acids, or the like, one or more buffer solutions and/or saline solutions for rinsing steps, and/or one or more analytes to be detected and/or analyzed. At least a fluid 112 and/or microfluidic device 104 may be used, without limitation, in processes as disclosed in U.S. Nonprovisional application Ser. No. 17/337,931, filed on Jun. 3, 2021, and entitled "METHODS AND SYSTEMS FOR MONOMER CHAIN FORMATION," and/or as disclosed in U.S. Nonprovisional application Ser. No. 17/403,480, filed on Aug. 16, 2021, and entitled "TAGGED-BASE DNA SEQUENCING READOUT ON WAVEGUIDE SURFACES," the entirety of each of which is incorporated herein by reference. Other exemplary embodiments of at least a reservoir 108 may include, without limitation, a well, a microfluidic channel, a flow component, and the like as described below in further detail.

With continued reference to FIG. 1, plurality of microfluidic features of microfluidic device 104 includes a plurality of microfluidic channels 116 connected to at least a reservoir 108. As used in this disclosure, a "microfluidic channel" is a reservoir having one or more of an inlet (i.e., input) and an outlet (i.e., output). In a non-limiting example, at least an inlet of one or more microfluidic channels may be connected to at least an outlet of at least a reservoir 108. At least a fluid 112 contained within at least a reservoir 108 may be input through the at least an inlet into microfluidic channels from the at least an outlet of at least reservoir 108, and then output from the at least an outlet of microfluidic channels. Plurality of microfluidic channels 116 may have a sub millimeter scale consistent with microfluidics. Each microfluidic channel of plurality of microfluidic channels 116 may have one or more distanced/common channel properties which affect other system properties such as, without limitation, the flow timing. As used in this disclosure, "flow timing" is any time-dependent property associated with a flow of at least a fluid 112 through plurality of microfluidic channels 116. For instance, in some cases, flow timing may include a duration for a flow to reach, pass through, or otherwise interact with an element of microfluidic device 104 and/or other microfluidic channels 116 (e.g., flow out from reservoir 108). As used in this disclosure, "channel properties" are objective characteristics associated with plurality of microfluidic channels 116 or microfluidic device 104 generally. Exemplary non-limiting channel properties include, without limitation, width, height, length, material, surface roughness, cross-sectional area, layout, and the like.

Additionally, or alternatively, and still referring to FIG. 1, plurality of microfluidic channels 116 is configured to create a microfluidic environment for a multi-steps assay (i.e., any assay with a plurality of assay steps). As used in this disclosure, a "microfluidic environment" refers to a complex system of plurality of microfluidic features (e.g., microfluidic channels, chambers, valves, other components within microfluidic devices 104 as described in this disclosure) in a pre-determined configuration that are used to transport and/or manipulate at least a fluid 112 on a microscale within apparatus 100. In an embodiment, plurality of microfluidic channels may be interconnected and/or intersecting; for instance, and without limitation, outlet of a first microfluidic channel may be connected to inlet of a second microfluidic channel. For another instance, and without limitation, first microfluidic channel and second microfluidic channel may meet at a junction or intersection point within microfluidic device 104, wherein at least a fluid 112 may be directed from one microfluidic channel to another. In a further example, and without limitation, first microfluidic channel may overlap or run parallel to second microfluidic channel in certain area of microfluidic device 104, allowing for different assay steps.

With continued reference to FIG. 1, apparatus 100 includes at least two active flow components 120*a-b* (i.e., first active flow component 120*a* and second active flow component 120*b*) fluidically connected to plurality of microfluidic features. As used in this disclosure, an "active flow component" is a component that imparts an active flow on a fluid, wherein the "active flow," for the purpose of this disclosure, is flow of fluid which is induced by external actuators, fields, or power sources. "Fluidically connected," for the purpose of this disclosure, refers to a connection state in which at least two active flow components 120*a-b* and plurality of microfluidic features such as, without limitation, at least a reservoir 108 are linked in a way that allows at least a fluid 112 to flow between them via plurality of microfluidic channels 116. In a non-limiting example, each active flow component of at least two active flow components 120*a-b* may include any active flow component as described in U.S. patent application Ser. No. 18/107,135, filed on Feb. 8, 2023, entitled "APPARATUS AND METHODS FOR ACTUATING FLUIDS IN A BIOSENSOR CARTRIDGE," the entirety of which is incorporated herein by reference. In some cases, at least two active flow components 120*a-b* may be incorporated into microfluidic device 104 via a side action injection molding, wherein the "side action injection molding" is a type of injection molding that employs side actions/side cores (i.e., additional mold components) to create complex geometries, undercuts, or features configured to hold at least two active flow components 120*a-b* within microfluidic device 104 that cannot be produced using a standard two-part mold.

Still referring to FIG. 1, in an embodiment, each active flow component of at least two active flow components 120*a-b* may include one or more pumps. Pump may include a substantially constant pressure pump (e.g., centrifugal pump) or a substantially constant flow pump (e.g., positive displacement pump, gear pump, and the like). Pump can be hydrostatic or hydrodynamic. As used in this disclosure, a "pump" is a mechanical source of power that converts mechanical power into fluidic energy. A pump may generate flow with enough power to overcome pressure induced by a load at a pump outlet. A pump may generate a vacuum at a pump inlet, thereby forcing fluid from a reservoir into the pump inlet to the pump and by mechanical action delivering this fluid to a pump outlet. Hydrostatic pumps are positive displacement pumps. Hydrodynamic pumps can be fixed displacement pumps, in which displacement may not be adjusted, or variable displacement pumps, in which the displacement may be adjusted. Exemplary non-limiting pumps include gear pumps, rotary vane pumps, screw pumps, bent axis pumps, inline axial piston pumps, radial piston pumps, and the like. Pump may be powered by any rotational mechanical work source, for example without limitation and electric motor or a power take off from an engine. Pump may be in fluidic communication with at least a reservoir 112. In some cases, reservoir 112 may be unpressurized and/or vented. Alternatively, reservoir 112 may be pressurized and/or sealed; for instance, by alignment component 116 such as, without limitation, sealer as described above.

In a non-limiting example, and still referring to FIG. 1, active flow component 120*a/b* may include a barrel 124*a/b* and a plunger 128*a/b* within the barrel 124*a/b*. As used in this disclosure, a "barrel" is a cylindrical container. A "plunger," for the purpose of this disclosure, is a component which can be moved inside the barrel, letting active flow component 120*a/b* draw in or expel a fluid through an inlet or outlet of active flow component 120*a/b*. In some embodiments, barrel 124*a/b* may include an inner diameter equal to the outer diameter of plunger 128*a/b*. In some cases, at least two active flow components 120*a-b* may be in the same configuration; for instance, and without limitation, the volume of a first barrel 124*a* of first active flow component 120*a* may be consistent with the volume of a second barrel 124*b* of second active flow component 120*b*. In other cases, at least two active flow components 120*a-b* may be in different configurations. In a non-limiting example, outer surface of plunger 128*a/b* may be in contact with inner surface of the barrel 124*a/b*, creating a partition within barrel 124*a/b*. In an embodiment, plunger 128*a/b* of active flow component 120*a/b* may include a sealing mechanism, wherein the "sealing mechanism," as described herein, is a system configured to create a pressure difference between two different areas in active flow component 120*a/b*. In a non-limiting example, sealing mechanism may enable active flow component 120*a/b* to create the partition within barrel 124*a/b* with a first pressure different than a second pressure outside barrel 124*a/b* and/or active flow component 120*a/b*, wherein the first pressure may be smaller than the second pressure. In some cases, such pressure difference may be created by different operation modes of active flow component 120*a/b* as described below in further detail.

With continued reference to FIG. 1, apparatus 100 includes at least a sensor device 132, Sensor device 124 may be configured to be in sensed communication with at least a fluid 112 contained within or otherwise acted upon by plurality of microfluidic features of microfluidic device 104. As used in this disclosure, a "sensor device" is one or more independent sensors, as described herein, where any number of the described sensors may be used to detect any number of physical quantities associated with the microfluidic environment created by plurality of microfluidic channels 116. In some embodiments, sensor device 132 may include an optical device. As used in this disclosure, an "optical device" is any device that generates, transmits, detects, or otherwise functions using electromagnetic radiation, including without limitation ultra-violet light, visible light, near infrared light, infrared light, and the like. In some embodiments, optical device may include one or more waveguide. As used in this disclosure, a "waveguide" is a component that is configured to propagate electromagnetic radiation, including without limitation ultra-violet light, visible light, near infrared light, infrared light, and the like. A waveguide may include a lightguide, a fiberoptic, or the like. A waveguide may include a grating within a transmissive material. In some cases, a waveguide may be configured to function as one or more optical devices, for example a resonator (e.g., microring resonator), an interferometer, or the like. In some cases, waveguide may be configured to propagate an electromagnetic radiation (EMR). In a non-limiting example, sensor device 132 may include a photonic sensor chip, wherein the photonic sensor chip is described in U.S. patent application Ser. No. 18/126,014, filed on Mar. 24, 2023, entitled as "PHOTONIC BIOSENSOR FOR MULTIPLEXED DIAGNOSTICS AND A METHOD OF USE," the entirety of which is incorporated herein by reference. Photonic sensor chip may be optical communication with one or more waveguide and configured to detect a variance in at least an optical property associated with the at least a fluid. As used in this disclosure, an "optical property" is any detectable characteristic associated with electromagnetic radiation, for instance UV, visible light, infrared, and the like. In some cases, at least a sensor device 132 may generate and/or communicate signal representative of the detected property as described below.

As used in this disclosure, a "signal" is any intelligible representation of data, for example from one device to another. A signal may include an optical signal, a hydraulic signal, a pneumatic signal, a mechanical signal, an electric signal, a digital signal, an analog signal, and the like. In some cases, a signal may be used to communicate with a computing device, for example by way of one or more ports. In some cases, a signal may be transmitted and/or received by a computing device, for example by way of an input/output port. An analog signal may be digitized, for example by way of an analog to digital converter. In some cases, an analog signal may be processed, for example by way of any analog signal processing steps described in this disclosure, prior to digitization. In some cases, a digital signal may be used to communicate between two or more devices, including without limitation computing devices. In some cases, a digital signal may be communicated by way of one or more communication protocols, including without limitation internet protocol (IP), controller area network (CAN) protocols, serial communication protocols (e.g., universal asynchronous receiver-transmitter [UART]), parallel communication protocols (e.g., IEEE 128 [printer port]), and the like.

With continued reference to FIG. 1, in some embodiments, apparatus 100 may include one or more light sources. As used in this disclosure, a "light source" is any device configured to emit electromagnetic radiation, such as without limitation light, UV, visible light, and/or infrared light. In some cases, a light source may include a coherent light source, which is configured to emit coherent light, for example a laser. In some cases, a light source may include a non-coherent light source configured to emit non-coherent light, for example a light emitting diode (LED). In some cases, light source may emit a light having substantially one wavelength. In some cases, light source may emit a light having a wavelength range. Light may have a wavelength in an ultraviolet range, a visible range, a near-infrared range, a mid-infrared range, and/or a far-infrared range. For example, in some cases light may have a wavelength within a range from about 100 nm to about 20 micrometers. In some cases, light may have a wavelength within a range of about 400 nm to about 2,500 nm. Light sources may include, one or more diode lasers, which may be fabricated, without limitation, as an element of an integrated circuit; diode lasers may include, without limitation, a Fabry Perot cavity laser, which may have multiple modes permitting outputting light of multiple wavelengths, a quantum dot and/or quantum well-based Fabry Perot cavity laser, an external cavity laser, a mode-locked laser such as a gain-absorber system, configured to output light of multiple wavelengths, a distributed feedback (DFB) laser, a distributed Bragg reflector (DBR) laser, an optical frequency comb, and/or a vertical cavity surface emitting laser. Light source may additionally or alternatively include a light-emitting diode (LED), an organic LED (OLED) and/or any other light emitter. In some cases, light source may be configured to couple light into optical device, for instance into one or more waveguide described above.

With continued reference to FIG. 1, in an embodiment, at least a sensor device 132 may include at least a photodetector. In some cases, at least a sensor device 132 may include a plurality of photodetectors, for instance at least a first photodetector and at least a second photodetector. In some cases, at least a first photodetector and/or at least a second photodetector may be configured to measure one or more of first optical output and second optical output, from a first waveguide and a second waveguide, respectively. As used in this disclosure, a "photodetector" is any device that is sensitive to light and thereby able to detect light. In some cases, a photodetector may include a photodiode, a photoresistor, a photosensor, a photovoltaic chip, and the like. In some cases, photodetector may include a Germanium-based photodiode. Light detectors may include, without limitation, Avalanche Photodiodes (APDs), Single Photon Avalanche Diodes (SPADs), Silicon Photomultipliers (SiPMs), Photo-Multiplier Tubes (PMTs), Micro-Channel Plates (MCPs), Micro-Channel Plate Photomultiplier Tubes (MCP-PMTs), Indium gallium arsenide semiconductors (InGaAs), photodiodes, and/or photosensitive or photon-detecting circuit elements, semiconductors and/or transducers. Avalanche Photo Diodes (APDs), as used herein, are diodes (e.g., without limitation p-n, p-i-n, and others) reverse biased such that a single photon generated carrier can trigger a short, temporary "avalanche" of photocurrent on the order of milliamps or more caused by electrons being accelerated through a high field region of the diode and impact ionizing covalent bonds in the bulk material, these in turn triggering greater impact ionization of electron-hole pairs. APDs provide a built-in stage of gain through avalanche multiplication. When the reverse bias is less than the breakdown voltage, the gain of the APD is approximately linear. For silicon APDs this gain is on the order of 10-100. Material of APD may contribute to gains. Germanium APDs may detect infrared out to a wavelength of 1.7 micrometers. InGaAs may detect infrared out to a wavelength of 1.6 micrometers. Mercury Cadmium Telluride (HgCdTe) may detect infrared out to a wavelength of 14 micrometers. An APD reverse biased significantly above the breakdown voltage is referred to as a Single Photon Avalanche Diode, or SPAD. In this case the n-p electric field is sufficiently high to sustain an avalanche of current with a single photon, hence referred to as "Geiger mode." This avalanche current rises rapidly (sub-nanosecond), such that detection of the avalanche current can be used to approximate the arrival time of the incident photon. The SPAD may be pulled below breakdown voltage once triggered in order to reset or quench the avalanche current before another photon may be detected, as while the avalanche current is active carriers from additional photons may have a negligible effect on the current in the diode. At least a first photodetector may be configured to generate a first signal as a function of variance of an optical property of the first waveguide, where the first signal may include without limitation any voltage and/or current waveform. Additionally, or alternatively, sensor device may include a second photodetector located down beam from a second waveguide. In some embodiments, second photodetector may be configured to measure a variance of an optical property of second waveguide and generate a second signal as a function of the variance of the optical property of the second waveguide.

With continued reference to FIG. 1, in some cases, photodetector may include a photosensor array, for example without limitation a one-dimensional array. Photosensor array may be configured to detect a variance in an optical property of waveguide. In some cases, first photodetector and/or second photodetector may be wavelength dependent. For instance, and without limitation, first photodetector and/or second photodetector may have a narrow range of wavelengths to which each of first photodetector and second photodetector are sensitive. As a further non-limiting example, each of first photodetector and second photodetector may be preceded by wavelength-specific optical filters such as bandpass filters and/or filter sets, or the like; in any case, a splitter may divide output from optical matrix multiplier as described below and provide it to each of first photodetector and second photodetector. Alternatively, or additionally, one or more optical elements may divide output from waveguide prior to provision to each of first photodetector and second photodetector, such that each of first photodetector and second photodetector receives a distinct wavelength and/or set of wavelengths. For example, and without limitation, in some cases a wavelength demultiplexer may be disposed between waveguides and first photodetector and/or second photodetector; and the wavelength demultiplexer may be configured to separate one or more lights or light arrays dependent upon wavelength. As used in this disclosure, a "wavelength demultiplexer" is a device that is configured to separate two or more wavelengths of light from a shared optical path. In some cases, a wavelength demultiplexer may include at least a dichroic beam splitter. In some cases, a wavelength demultiplexer may include any of a hot mirror, a cold mirror, a short-pass filter, a long pass filter, a notch filter, and the like. An exemplary wavelength demultiplexer may include part No. WDM-11P from OZ Optics of Ottawa, Ontario, Canada. Further examples of demultiplexers may include, without limitation, gratings, prisms, and/or any other devices and/or components for separating light by wavelengths that may occur to persons skilled in the art upon reviewing the entirety of this disclosure. In some cases, at least a photodetector may be communicative with computing device, such that a sensed signal may be communicated with computing device.

With continued reference to FIG. 1, at least a sensor device 132 may be integrated into microfluidic device 104. In such embodiment, microfluidic device 104 may be utilized in an advanced diagnostic device or diagnostic sensor for detection of biological signatures (e.g., viruses, bacteria, pathogens, and the like). In some cases, plurality of microfluidic features may be fabricated on a substrate. Substrate may be composed of various materials, such as glass, silicon, and the like. In one or more embodiments, microfluidic device 104 containing plurality of microfluidic features may be fabricated using various processes, such as, for example, photolithography, injection molding, stamping processes, and the like. In various embodiments, substrate may be substantially planar. In some embodiments, microfluidic feature 108 may be built on a substrate using, for example, photosensitive polymers or photoresists (e.g., SU-8, Ostemer, and the like). In other embodiments, plurality of microfluidic feature may be molded or stamped into polymers (e.g., PMMA). In other embodiments, components and/or devices of microfluidic device 104 may be built into or on substrate using etching processes, in which plurality of microfluidic channels 116, at least a reservoir 108, and/or the like may be built by removing materials from substrate. In non-limiting embodiments, the entire microfluidic system may be fabricated on substrate, sealed with a cover plate, where holes are drilled and aligned with certain microfluidic components, such as at least a reservoir 112. Additionally, or alternatively, substrate may then be diced into small chips. Chips may also be fabricated with microfluidic features etch or patterned on them. Further, they can be coupled to microfluidic features fabricated separately on another substrate such as plastic or glass.

With continued reference to FIG. 1, apparatus 100 includes an external device 136 connected to microfluidic device 104 using at least an alignment feature 140. As used in this disclosure, an "external device" refers to any equipment, instrument, or system that is not an integral part of microfluidic device 104 itself but is necessary for its operation, control, or analysis. External device 136 may interface with microfluidic device to provide various functions, such as any processing step as described in this disclosure. An "alignment feature," for the purpose of this disclosure, is a physical feature that helps to precisely align, interface, or couple one component with one or more other components. In a non-limiting example, alignment feature 140 may be configured for precise positioning and attaching external device 136 to microfluidic device 104 through a multi-fiber push connector (MPO) as described in further detail below. Additionally, or alternatively, alignment feature 140 may be configured for precise positioning and attaching at least sensor device 132 as described above. Further, alignment feature 140 may be configured for precise positioning plurality of microfluidic features; for instance, and without limitation, plurality of microfluidic channels 116 may be etched along alignment feature 140. In a non-limiting example, alignment feature 140 may be consistent with any alignment feature as described in U.S. patent application Ser. No. 18/121,712.

With continued reference to FIG. 1, external device 136 includes at least two actuators 144*a-b*. As used in this disclosure, an "actuator" is a device that produces a motion by converting energy and signals going into the system. In some cases, motion may include linear, rotatory, or oscillatory motion. Each actuator of at least two actuators 144*a-b* may include a component of a machine that is responsible for moving and/or controlling a mechanism or system. Each actuator of at least two actuators 144*a-b* may, in some cases, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or even human power. In some cases, an actuator may have an energy or power source other than control signal. This may include a main energy source, which may include for example electric power, hydraulic power, pneumatic power, mechanical power, and the like. In some cases, upon receiving a control signal, each actuator of at least two actuators 144*a-b* responds by converting source power into mechanical motion. In some cases, each actuator of at least two actuators 144*a-b* may be understood as a form of automation or automatic control.

With continued reference to FIG. 1, in an embodiment, each actuator of at least two actuators 144*a-b* may include a hydraulic actuator. A hydraulic actuator may consist of a cylinder or fluid motor that uses hydraulic power to facilitate mechanical operation. Output of hydraulic actuator may include mechanical motion as described above. In some cases, hydraulic actuator may employ a liquid hydraulic fluid. As liquids, in some cases. are incompressible, a hydraulic actuator can exert large forces. Additionally, as force is equal to pressure multiplied by area, hydraulic actuators may act as force transformers with changes in area (e.g., cross sectional area of cylinder and/or piston). An exemplary hydraulic cylinder may consist of a hollow cylindrical tube within which a piston can slide. In some cases, a hydraulic cylinder may be considered single acting. Single acting may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. Double acting may be used when pressure is applied substantially on each side of a piston; any difference in resultant force between the two sides of the piston causes the piston to move.

With continued reference to FIG. 1, in another embodiment, each actuator of at least two actuators 144*a-b* may include a pneumatic actuator. In some cases, a pneumatic actuator may enable considerable forces to be produced from relatively small changes in gas pressure. In some cases, a pneumatic actuator may respond more quickly than other types of actuators, for example hydraulic actuators. A pneumatic actuator may use compressible fluid (e.g., air). In some cases, a pneumatic actuator may operate on compressed air. Operation of hydraulic and/or pneumatic actuators may include control of one or more valves, circuits, fluid pumps, and/or fluid manifolds.

With continued reference to FIG. 1, in another embodiment, each actuator of at least two actuators 144*a-b* may include a mechanical actuator. In some cases, a mechanical actuator may function to execute movement by converting one kind of motion, such as rotary motion, into another kind, such as linear motion. An exemplary mechanical actuator includes a rack and pinion. In some cases, a mechanical power source, such as a power take off may serve as power source for a mechanical actuator. Mechanical actuators may employ any number of mechanism, including for example without limitation gears, rails, pulleys, cables, linkages, and the like.

With continued reference to FIG. 1, in a further embodiment, each actuator of at least two actuators 144*a-b* may include an electric actuator. Electric actuator may include any of electromechanical actuators, linear motors, and the like. In some cases, electric actuator may include an electromechanical actuator. An electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a control signal may control one or more electric motor parameters to control electromechanical actuator. Exemplary non-limitation electric motor parameters include rotational position, input torque, velocity, current, and potential. Electric actuator may include a linear motor. Linear motors may differ from electromechanical actuators, as power from linear motors is output directly as translational motion, rather than output as rotational motion and converted to translational motion. In some cases, a linear motor may cause lower friction losses than other devices. Linear motors may be further specified into at least 3 different categories, including flat linear motor, U-channel linear motors and tubular linear motors. Linear motors may be directly controlled by a control signal for controlling one or more linear motor parameters. Exemplary linear motor parameters include without limitation position, force, velocity, potential, and current. In a non-limiting example, each actuator of at least two actuators 144*a-b* may include a linear actuator. As used in this disclosure, a "linear actuator" is an actuator that creates linear motion. Linear actuator may create motion in a straight line. Wherein each active flow component of at least two active flow component 120*a-b* may be aligned with the straight line.

With continued reference to FIG. 1, at least two actuators 144*a-b* are configured to connect at least two active flow components 120*a-b* using at least a mechanical interface 148. As used in this disclosure, a "mechanical interface" is a physical connection or coupling mechanism designed to interact with at least two actuator 144*a-b*. At least a mechanical interface 148 may facilitate the transfer of energy, force, or motion between at least two actuator 144*a-b* and at least two active flow components 120*a-b*. In a non-limiting example, plunger 128*a/b* may include a shaft 152*a/b*. A "shaft," as described herein, is a part or section forming a handle of plunger 128*a/b*. Shaft 152*a/b* may be attached to one end of plunger 128*a/b*. At least a mechanical interface 148 may include a multiple plunger grabbing mechanism; for instance, and without limitation, connecting at least two active flow components 120*a-b* may include accepting plunger 128*a-b* by grabbing shaft 152*a-b* attached to plunger 128*a-b* using at least a mechanical interface 148. As described herein, a "multiple plunger grabbing mechanism" is a mechanical coupling system that is designed to engage multiple plungers of active flow components simultaneously or sequentially within microfluidic device 104. In an embodiment, mechanical interface 148 may allow at least two actuators 144*a-b* to actuate plungers 128*a-b* of at least two active flow components 120*a-b* simultaneously or sequentially by providing coordinated force/motion via the multiple plunger grabbing mechanism. Exemplary embodiments of at least a mechanical interface 148 are described below.

Still referring to FIG. 1, in some cases, mechanical interface 148 configured to connect at least two active flow components (specifically, plunger 128*a-b*) and at least two actuators 144*a-b* may include, without limitation, friction fit, an interference fit, or a snap fit, or the like. In a non-limiting example, shaft 152*a/b* of plunger 128*a/b* may include a male or female adapter and each actuator of at least two actuators 144*a-b* may include a female or male adapter. When the male (female) adapter engages with the female (male) adapter, a mechanical connection is established between at least two active flow components 120*a-b* and at least two actuators 144*a-b*. Additionally, or alternatively, at least a mechanical interface 148 may be designed so that it automatically disengages when a certain level of force is applied. Further, at least a mechanical interface 148 may be designed so that a mechanical input is necessary to cause the male and female connectors to disengage. In some cases, this mechanical coupling between plunger 128*a/b* of active flow component 120*a/b* and actuator 144*a/b* may be accomplished by other means (e.g., a Janney coupler, knuckle coupler, etc.). In a non-limiting example, at least a mechanical interface 148 may include an implementation of magnetic coupling. Mechanical connection between plungers 128*a-b* of at least two active flow components 120*a-b* and at least two actuators 144*a-b* may be accomplished by a magnet or multiple magnets.

In a non-limiting example, and still referring to FIG. 1, at least a mechanical interface 148 having multiple plunger grabbing mechanism may include a plurality of expandable claws, wherein the "expandable claw," for the purpose of this disclosure, is a component that can be opened or closed to grip, catch, or hold another component with an acceptable width of height. The number of expandable claws may be equivalent to the number of active flow components within microfluidic device 104 or the number of actuators within external device 136. Each expandable claw of plurality of expandable claws may include an upper jaw and a lower jaw, wherein the upper jaw is an upper half portion of expandable claw, and the lower jaw is a lower half portion of expandable jaw. In an embodiment, connecting at least two active flow components 120*a-b* may include accepting plunger 128*a/b* of active flow component 120*a/b* by opening the corresponding expandable claw. Opening expandable claw may include moving upper jaw/lower jaw away from lower jaw/upper jaw. Accepting plunger 128*a/b* of active flow component 120*a/b* may further include closing expandable claw. Closing expandable claw may include moving upper jaw/lower jaw towards lower jaw/upper jaw. Closing expandable claw may include moving upper jaw and lower jaw towards upper surface and lower surface of shaft 152*a/b* connected to plunger 128*a/b*; therefore, plunger 128*a-b* of active flow component 120*a/b* may be accepted by expandable claw as a function of a static feature, wherein the static feature may include friction formed by the contact of each expandable claw and shaft 152*a/b*.

Continuing the non-limiting example, and still referring to FIG. 1, at least a mechanical interface 148 having multiple plunger grabbing mechanism may further include a plurality of collars, wherein each collar of the plurality of collars may be configured to constraint each expandable claw of plurality of expandable claws. As used in this disclosure, a "collar" is a ring-shaped device that clamps around shaft 152*a/b* connected to plunger 128*a/b*. In some cases, collar may be made of plastic or metal. In some embodiments, each collar may be configured to hold corresponding expandable claw, to facilitate and/or regulate its proper movement. For an example, and without limitation, each expandable claw of plurality of expandable claws may be held closed by its corresponding collar which is preloaded by a spring or by other means at its initial state. Each expandable claw of plurality of expandable claws may be allowed to open by retracting corresponding collar in a direction towards connected actuator. This may occur automatically when the connected actuator reaches a pre-determined point in its travel and a feature on the moving collar makes contact with a static feature such as an alignment feature. At least a mechanical interface 148 and expandable claws may be consistent with any mechanical interface and expandable claws as described in U.S. patent application Ser. No. 18/107,135.

With continued reference to FIG. 1, at least two actuators 144*a-b* are configured to initiate a plurality of active flow processes corresponds to plurality of assay steps as a function of at least two active flow components 120*a-b*. As used in this disclosure, "active flow processes" are actions or steps taken on active flow component in order to impart active flow on at least a fluid 112 contained within or otherwise acted upon by microfluidic device 104 as described above. In an embodiment, plurality of active flow process may include a reverse flow process. As used in this disclosure, a "reverse flow process" is an active flow process in a reverse direction, wherein the reverse direction is defined as a direction of at least a fluid 112 flow out of at least a reservoir 108 of microfluid device 104. In a non-limiting example, initiating plurality of active flow processes may include initiating, by at least one active flow component (i.e., either first active flow component 120*a* or second active flow component 120*b*), reverse flow process as a function of the movement of the plunger of the at least one active flow component from a first position to a second position, wherein the second position is after the first position within the barrel of the at least one active flow component. Such movement of the plunger may be actuated by at least one actuator (i.e., either first actuator 144*a* or second actuator 144*b*) connected to the at least one active flow component based on a pull regime of the at least one active flow component. As used in this disclosure, a "pull regime" is a mode of operation (i.e., first operation mode) of active flow component 120*a/b* configured to create a flow of at least a fluid by actively pulling or drawing at least a fluid 112 through plurality of microfluidic features within microfluidic device 104.

Additionally, or alternatively, and still referring to FIG. 1, in another embodiment, plurality of active flow process may include a forward flow process. As used in this disclosure, a "forward flow process" is an active flow process in a forward direction, wherein the forward direction is defined as a direction of at least a fluid 112 flow into at least a reservoir 108 of microfluidic device 104. In a non-limiting example, initiating plurality of active flow processes may include initiating, by at least one active flow component (i.e., either first active flow component 120*a* or second active flow component 120*b*), forward flow process as a function of the movement of the plunger of the at least one active flow component from a first position to a second position, wherein the second position is before the first position within the barrel of the at least one active flow component. Such movement of the plunger may be actuated by at least one actuator (i.e., either first actuator 144*a* or second actuator 144*b*) connected to the at least one active flow component based on a push regime of the at least one flow component. As used in this disclosure, a "push regime" is a mode of operation (i.e., second operation mode) of active flow component 120*a/b* configured to create a flow of at least a fluid 112 by actively pushing or expel at least a fluid through plurality of microfluidic features within microfluidic device 104. In a non-limiting example, pull regime and push regime of active flow component 120*a/b* may be consistent with any pull regime and push regime of any active flow component as described in U.S. patent application Ser. No. 18/121,712.

With continued reference to FIG. 1, at least two active flow components 120*a-b* may be configured to flow at least a fluid 112 bi-directionally through at least a sensor device 132 within microfluidic environment as a function of plurality of active flow processes as described above. In an embodiment, at least a sensor device 132 may include a sensor interface. In an embodiment, sensor interface may be configured to wet waveguide with at least a fluid 112 contained within or otherwise acted upon by microfluidic device 104. Flowing at least a fluid 112 may include flowing at least a fluid through sensor interface, allowing at least a sensor device 132 to detect at least a sensed property such as a flow property. As used in this disclosure, a "sensor interface" is an arrangement permits at least a sensor device 132 to be in sensed communication with microfluidic device 104. In some embodiments, sensor interface may include an optical interface. As used in this disclosure, an "optical interface" is an arrangement permits optical device to be in sensed communication with microfluidic device 104. As used in this disclosure, "flow properties" are characteristics related to a flow of at least a fluid 112. For instance, exemplary non-limiting flow properties include flow rate (in μl/min), flow velocity, integrated flow volume, pressure, differential pressure, and the like. Additionally, or alternatively, at least a sensed property may also include at least an analyte characteristics of the target analyte of the assay, wherein the at least an analyte characteristics may include any analyte characteristics as described in U.S. patent application Ser. No. 18/199,171, filed on May 18, 2023.

Still referring to FIG. 1, sensor interface of at least a sensor device 132 may include a flow cell. As used in this disclosure, a "flow cell" is a component of or associated with microfluidic device 104 that contains and provides access to a fluid or a flow of the fluid for a sensor interface arrangement. In some cases, a flow cell may effectively increase an area over which at least a fluid flows, thereby increasing access to the at least a fluid for optical sensing. In some cases, a flow cell may include micro-posts. In some cases, a flow cell may include a plurality of micro-posts. As used in this disclosure, "micro-posts" are small scale (e.g., sub-millimeter) protrusions which break up a flow path. In some cases, a micro-post property may be varied in order to affect a flow property. Exemplary non-limiting micro-post properties include pitch, micro-post width (e.g., diameter), micro-post arrangement (e.g., hexagonal), micro-post size (e.g., column), micro-post height, number of micro-posts (total, in a row, in a column, etc.), and the like.

With continued reference to FIG. 1, in some cases, at least a fluid 112 may be actuated in a first direction (i.e., reverse direction) or a second direction (i.e., forward direction), by at least two active flow components 120*a-b* (connected to at least two actuators 144*a-b*) operated synchronously. Actuation of pull regime and/or push regime of at least two active flow components 120*a-b* may create a fluid flow path within microfluidic environment for at least a fluid 112. As used in this disclosure, a "fluid flow path" refers to a defined route or trajectory that at least a fluid 112 takes as it moves through microfluidic device 104 via plurality of microfluidic features such as, without limitation, plurality of microfluidic channels 116, chambers, and other structures. Creating fluid flow path for at least a fluid 112 may include enabling interactions between at least a fluid 112 between various components within microfluidic device 104 such as, without limitation, at least a sensor device 132 as described above. At least a fluid 112 may flow towards one or more microfluidic feature with relatively less pressure; therefore, the pressure difference created by at least two active flow components operate under same or different operation mode may drive the flow of at least a fluid 112 within microfluidic environment.

In a non-limiting example, and still referring to FIG. 1, when both first active flow component 120*a* and second active flow component 120*b* are operating at first operation mode (i.e., actuating pull regime of active flow components 120*a-b* synchronously), at least a fluid 112 may flow in a reverse direction, from at least a reservoir 108, through at least a sensor device 132, into both active flow components 120*a-b* (if the forces applied by actuators 144*a-b* to pull plungers 128*a-b* are equivalent), or any of active flow components 120*a-b* with relatively low pressure (if the forces applied to plungers 128*a-b* are different).

In another non-limiting example, and still referring to FIG. 1, when both first active flow component 120*a* and second active flow component 120*b* are operating at second operation mode (i.e., actuating push regime of active flow components 120*a-b* synchronously), at least a fluid 112 may flow in a forward direction, from both active flow components 120*a-b*, through at least a sensor device 132, into at least a reservoir 108. Flow property, such as, without limitation, flow rate of at least a fluid 112 may be equivalent if the forces applied by actuators 144*a-b* to push plungers 129*a-b* are equivalent, otherwise active flow components 120*a-b* may have different flow rates.

In a further non-limiting example, and still referring to FIG. 1, at least two active flow components 120*a-b* may operate at different operation modes. In some cases, first active flow component 120*a* may operate at second operation mode and second active flow component 120*b* may operate at first operation mode; for instance, and without limitation, the first active flow component 120*a* may execute push regime and the second active flow component 120*b* may execute pull regime. In this case, at least a fluid 112 may be direct, within microfluidic environment, from first active flow component 120*a* towards second active flow component 120*b*. In other cases, first active flow component 120*a* may operate at first operation mode and second active flow component 120*b* may operate at second operation mode; for instance, and without limitation, the first active flow component 120*a* may execute pull regime and the second active flow component 120*b* may execute push regime. In this case, at least a fluid 112 may be directed, within microfluidic environment, from second active flow component 120*b* towards first active flow component 120*a*. Such synchronization of at least two active flow components 120*a-b* may enable the creation of a pseudo valve, allowing at least a fluid 112 to flow in different fluid flow paths. Exemplary embodiments of synchronous actuation of at least two active flow components are described below in further detail with reference to FIGS. 4A-C.

With continued reference to FIG. 1, in other cases, at least two active flow components 120*a-b* may be actuated, by at least two actuators 144*a-b*, asynchronously. In an embodiment, at least two active flow components 120*a-b* may operate independently of each other in terms of timing, flow rate, or other means. In such an embodiment, each actuator of at least two actuators 144*a-b* may actuate connected flow component independently. In a non-limiting example, each actuator of at least two actuators 144*a-b* may be configured to initiate active flow process separately. First actuator 144*a* may be configured to initiate a first active flow process (e.g., via pull/push regime of first active flow component 120*a*) and second actuator 144*b* may be configured to initiate a second active flow process (e.g., via pull/push regime of second active flow component 120*b*), wherein the second active flow process may be subsequent to the first active flow process. Such asynchronous operation of at least two active flow components 120*a-b* may allow for independent control of the fluid input, which may be particularly useful in assays where independent control of fluid is desired and precise control over the timing or sequence of fluid delivery is needed, such as, without limitation, time-lapse enzyme inhibition assay using microfluidic device 104. Exemplary embodiments of asynchronous actuation of at least two active flow components are described below in further detail with reference to FIGS. 3A-C.

With continued reference to FIG. 1, external device 136 includes a reading device 156 communicatively connected to at least a sensor device 132. Reading device 156 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Reading device 156 may include a single computing device operating independently, or may include two or more computing device operating in concert, in parallel, sequentially or the like; two or more computing devices may be included together in a single computing device or in two or more computing devices. Reading device 156 may interface or communicate with one or more additional devices as described below in further detail via a network interface device. Network interface device may be utilized for connecting reading device 156 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Reading device 156 may include but is not limited to, for example, a computing device or cluster of computing devices in a first location and a second computing device or cluster of computing devices in a second location. Reading device 156 may include one or more computing devices dedicated to data storage, security, distribution of traffic for load balancing, and the like. Reading device 156 may distribute one or more computing tasks as described below across a plurality of computing devices of computing device, which may operate in parallel, in series, redundantly, or in any other manner used for distribution of tasks or memory between computing devices. Reading device 156 may be implemented using a "shared nothing" architecture in which data is cached at the worker, in an embodiment, this may enable scalability of system 100 and/or computing device.

With continued reference to FIG. 1, reading device 156 may be designed and/or configured to perform any method, method step, or sequence of method steps in any embodiment described in this disclosure, in any order and with any degree of repetition. For instance, reading device 156 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Reading device 156 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, in some cases, reading device 156 may perform one or more signal processing steps on a signal. For instance, reading device 156 may analyze, modify, and/or synthesize a signal representative of data in order to improve the signal, for instance by improving transmission, storage efficiency, or signal to noise ratio. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which vary continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

Still referring to FIG. 1, reading device 156 is configured to read at least a sensed property from at least sensor device 132. Exemplary sensed property may include, without limitation, optical property (e.g., wavelength, frequency, intensity, polarization, spectral distribution, absorption and emission spectra, and the like), flow property (e.g., flow rate, flow velocity, integrated flow volume, pressure, and the like), and the like. Reading device 156 may be configured to read, interpret, or otherwise record (optical, electrical, and/or magnetic) signals generated and output by at least a sensor device 132. In a non-limiting example, at least a sensor device 132 may transfer output data containing, without limitation, at least a sensed property to reading device 156 using an optical fiber ribbon and a multi-fiber push connector (MPO). An "optical fiber ribbon," for the purpose of this disclosure, is a specialized cable consisting of a plurality of optical fibers bundled together in a flat, ribbon-like configuration. Each optical fibers of plurality of optical fibers may be made of glass or plastic. Each optical fibers of plurality of optical fibers may be configured to transmit light signals with very low loss over a long distances. In some embodiments, optical fiber ribbon may be used to transfer optical properties as described above from at least a sensor device 132 to reading device 156 through MPO. As used in this disclosure, a "multi-fiber push connector" is a connection component configured to connect optical fiber ribbon between microfluidic device 104 and external device 136. In some embodiments, MPO may include a plug with a row of plurality of optical fibers that are aligned and held in place by precision pins. The connector typically consists of a plug with a row of plurality of optical fibers that are aligned and held in place by one or more precision pins, wherein the precision pins are pins used in manufacturing and assembly processes to ensure precise and accurate alignment of components such as, without limitation, plurality of optical fibers. Additionally, or alternatively, MPO may be used as alignment feature for coupling microfluidic device 104 (containing at least a sensor device 132 and at least two active flow components 120*a-b*) to external device 136 (containing at least two actuators 144*a-b* and reading device 156), providing a precise alignment for at least two actuators 144*a-b* to connect with at least two active flow components 120*a-b*. MPO may protrude outward from a housing (i.e., an outer structure) of microfluidic device. MPO may guide the alignment of at least two active flow components 120*a-b* to at least two actuators 144*a-b*; for instance, and without limitation, shafts 152*a-b* attached to plungers 128*a-b* of at least two active flow components 120*a-b* may be aligned with at least a mechanical interface 148 connected to at least two actuators 144*a-b* based on the connection of MPO to external device 136. Other exemplary embodiments of alignment features may include, without limitation, bracket, press fastener, press fastener with spring mechanism, or the like which are described further in U.S. patent application Ser. No. 18/121,712.

Figure 2A:
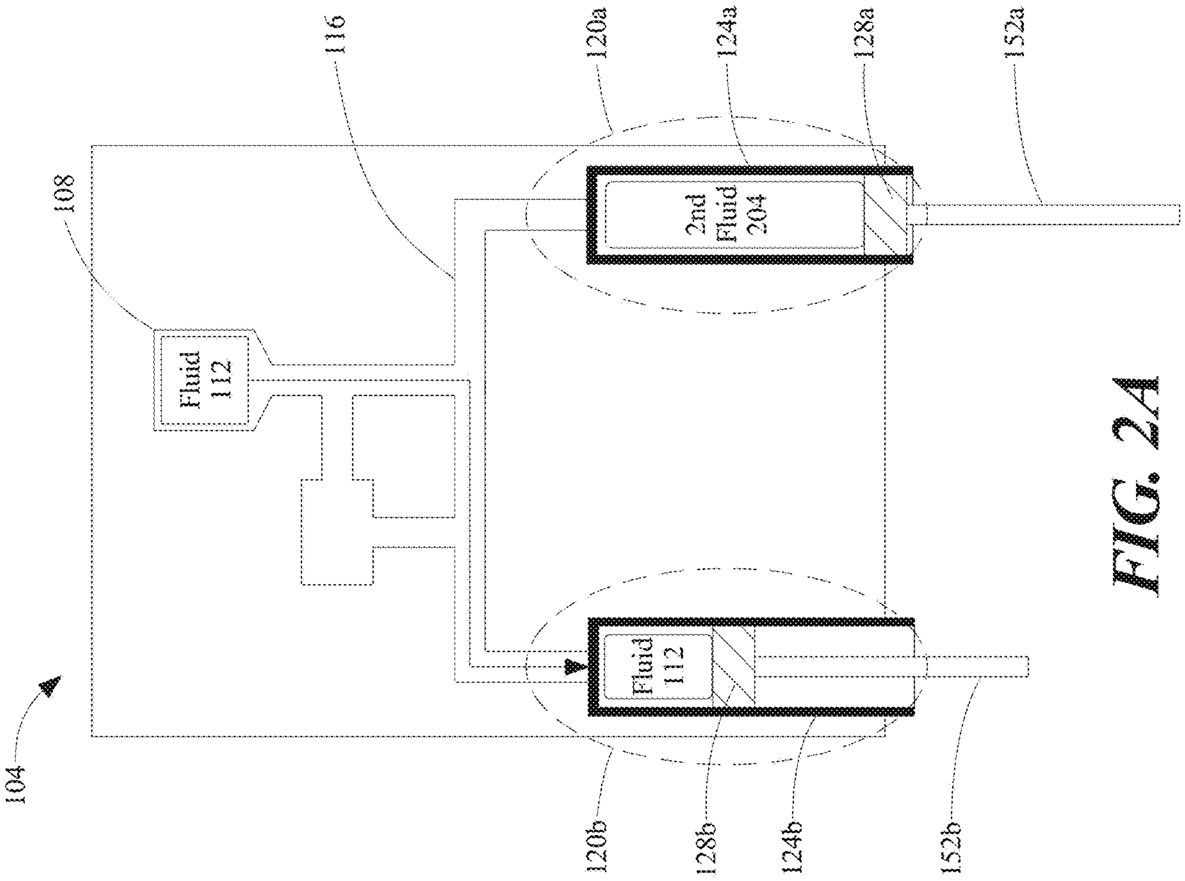
FIGS. 2A-C are diagrams illustrating an exemplary utilization of one active flow component of the plurality of active flow components as a valve.
Figure 2B:
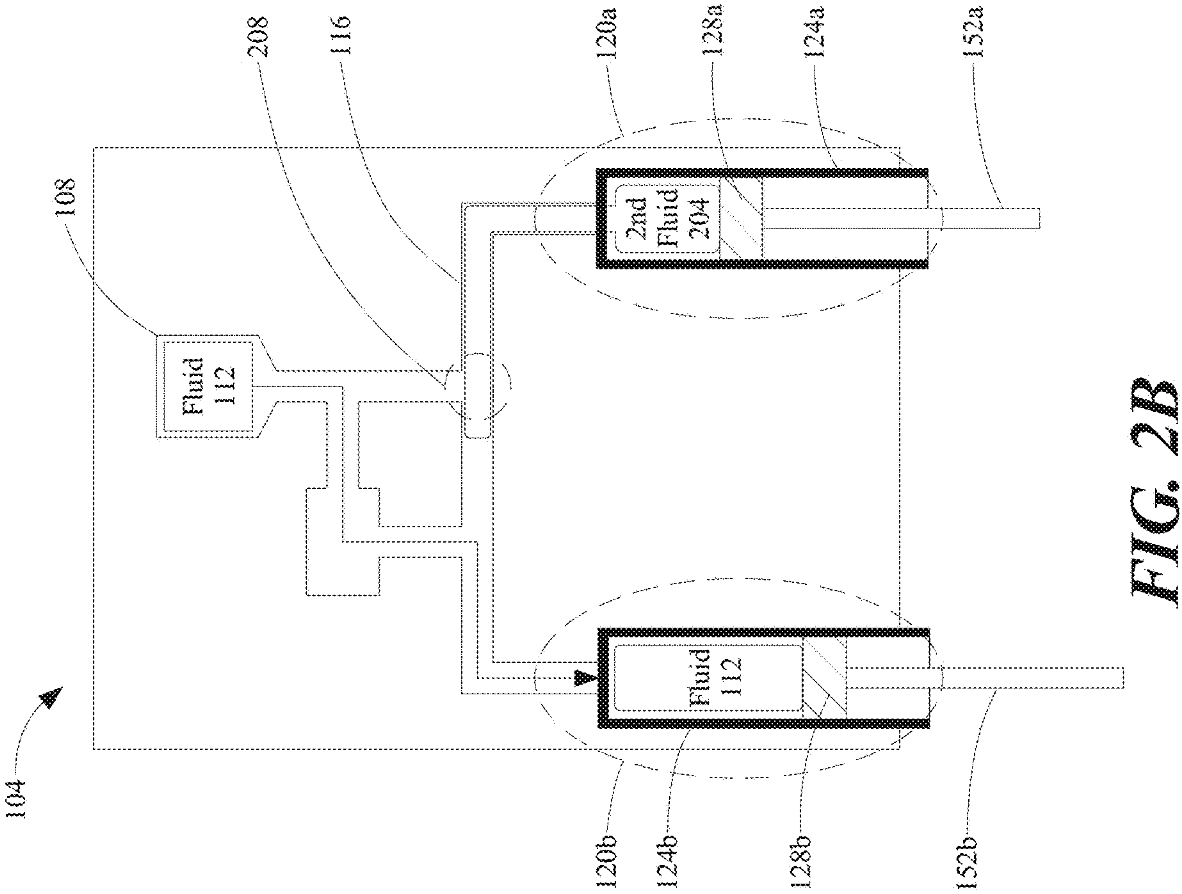
Figure 2C:
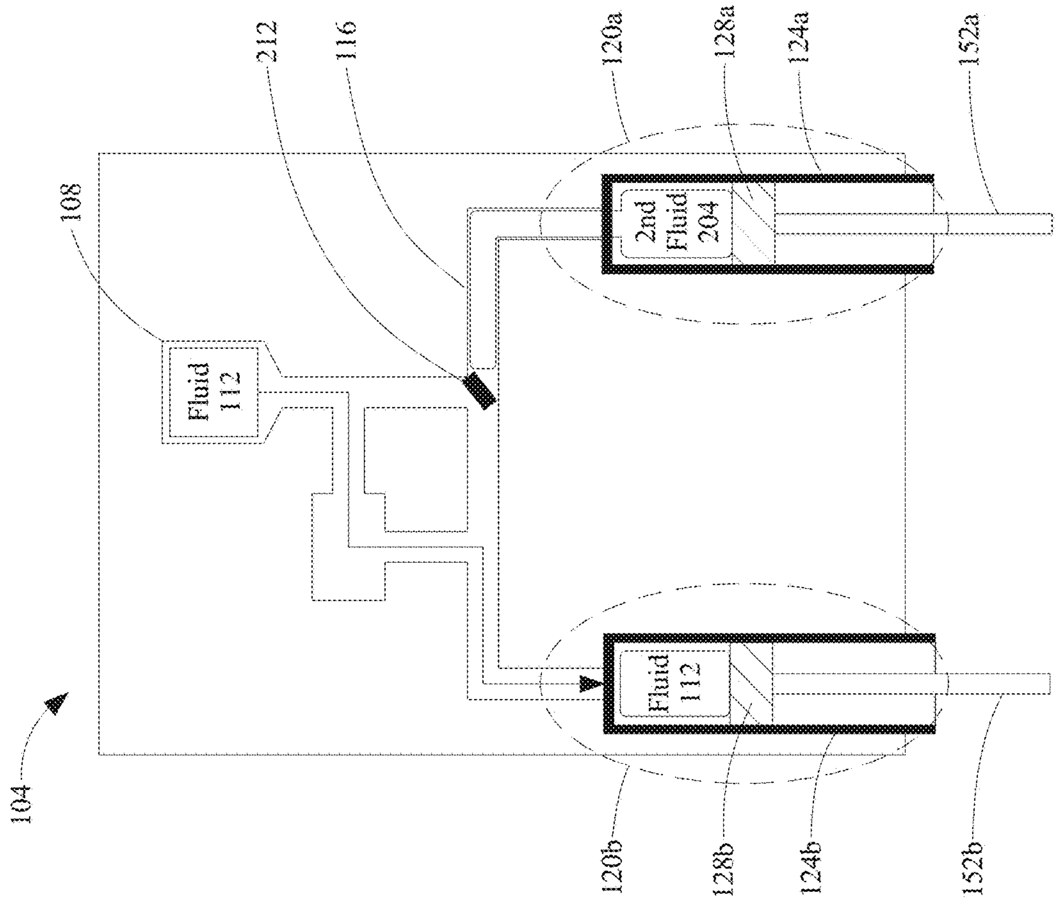

Now referring to FIGS. 2A-C, an exemplary utilization of one active flow component of plurality of active flow components as a valve. Plurality of microfluidic features may include a microfluidic flow regulator, wherein the "microfluidic flow regulator," for the purpose of this disclosure, is a mechanism, component, or otherwise a device within microfluidic device 104 configured to regulate the fluid flow within microfluidic environment. In an embodiment, microfluidic flow regulator may include a valve. As used in this disclosure, a "valve" is a component that controls fluidic communication between two or more components. Valves may be included in a plurality of microfluidic channels, for example allowing for multiple ports and fluid flow paths. In a non-limiting example, at least a fluid 112 may flow from at least a reservoir 108 towards second active flow component 120*b* as the pull regime of second active flow component 120*b* is active, while first active flow component 120*a* may be inactive (e.g., plunger 128*a* may remain stationary within barrel 124*a* at a natural position). A pressure difference may be created within microfluidic environment by second active flow component 120*b*, resulting a fluid flow path for at least a fluid 112 to flow in reverse direction as shown in FIG. 2A.

In some cases, referring to FIG. 2B, at least two active flow components 120*a-b* may work synchronously to create fluid flow path, wherein first active flow component 120*a* may utilize a second fluid 204 such as a high viscosity fluid to create a pseudo valve 208. Second fluid 204 may be stored within barrel 124*a* of first active flow component 120*a*. As used in this disclosure, a "pseudo valve" is a passive fluidic control mechanism which relies on geometric design features (i.e., plurality of microfluidic features) or fluidic resistance to regulate the flow of at least a flow 112 within microfluidic device 104. In an embodiment, pseudo valve 208 may not require any external actuation or power to control the flow of at least a fluid 112. In some cases, second fluid 204 may include an air bubble. In a non-limiting example, as the pull regime of second active flow component 120*b* is active, first actuator 144*a* of at least two actuators 144*a-b* may initiate a forward flow process: actuating the push regime of first active flow component 120*a* and flowing second fluid 204 within barrel 204*a* in a forward direction (i.e., towards at least a reservoir 108) along the microfluidic channel, thereby creating an alternative fluid flow path for at least a fluid 112.

In some cases, referring to FIG. 2C, valve may include a pressure-actuated valve 212. As used in this disclosure, a "pressure-actuated valve" is a type of valve that controls the flow of at least a fluid 112 by using an applied pressure to change the valve's state between open and closed position. In a non-limiting example, actuation of the push regime of first active flow component 120*a* containing second fluid 204 may a positive pressure. Plurality of microfluidic channel may include a pressure-actuated valves 212 which can be activated (i.e., opened/closed) with positive pressure created by first active flow component 120*a* to control the fluid flow path of at least a fluid 112.

With further reference to FIGS. 2A-C, other exemplary non-limiting valves may include, without limitation, directional valves, control valves, selector valves, multi-port valves, check valves, and the like. Valves may be actuated by any known method, such as without limitation by way of hydraulic, pneumatic, mechanical, or electrical energy. For instance, in some cases, a valve may be actuated by an energized solenoid or electric motor within external device 136. Valve actuators and thereby valves themselves, may be controlled by a computing device such as, without limitation, reading device 156. Reading device 156 may be in communication with valve, for example by way of one or more of electrical communication, hydraulic communication, pneumatic communication, mechanical communication, and the like.

Figure 3A:
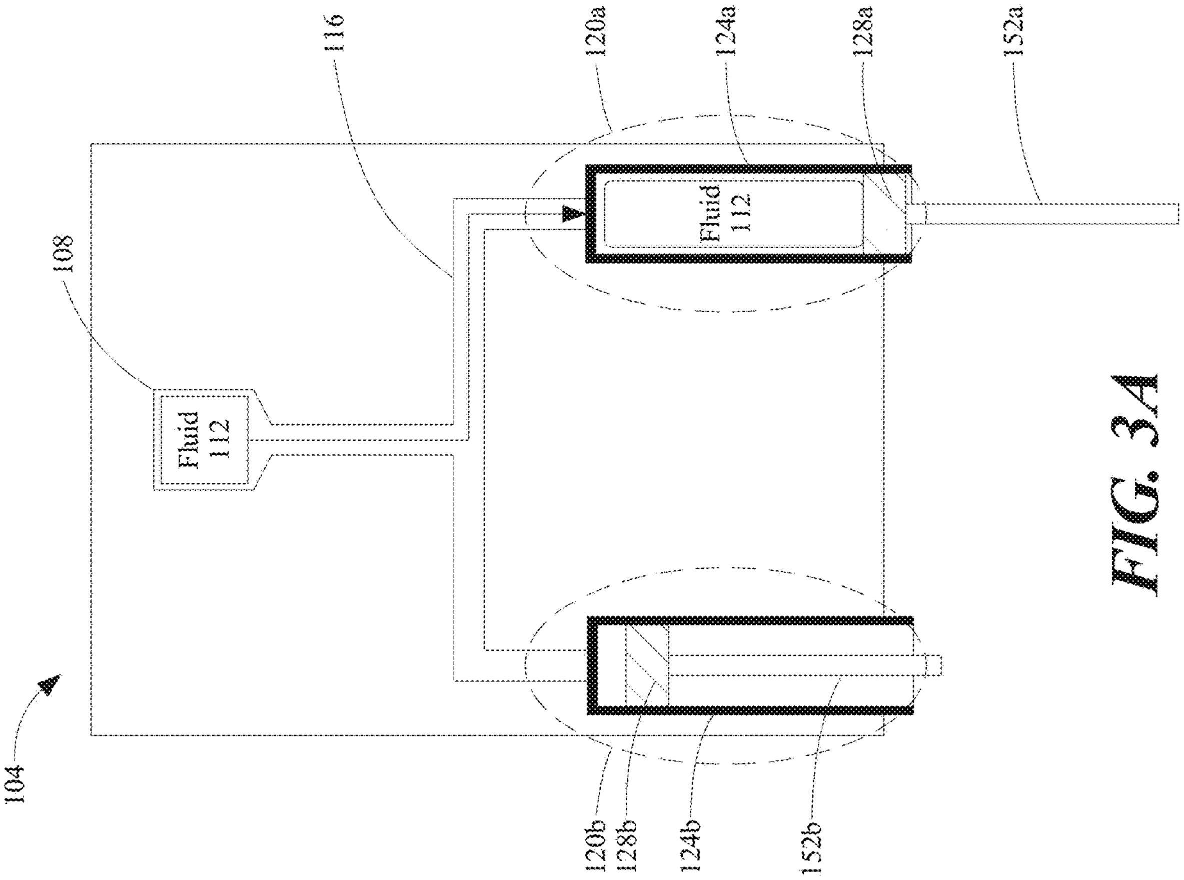
FIGS. 3A-C are diagrams illustrating an exemplary utilization of one active flow component of the plurality of active flow components as a reservoir, a fluid isolator, and a fluid incubator.
Figure 3B:
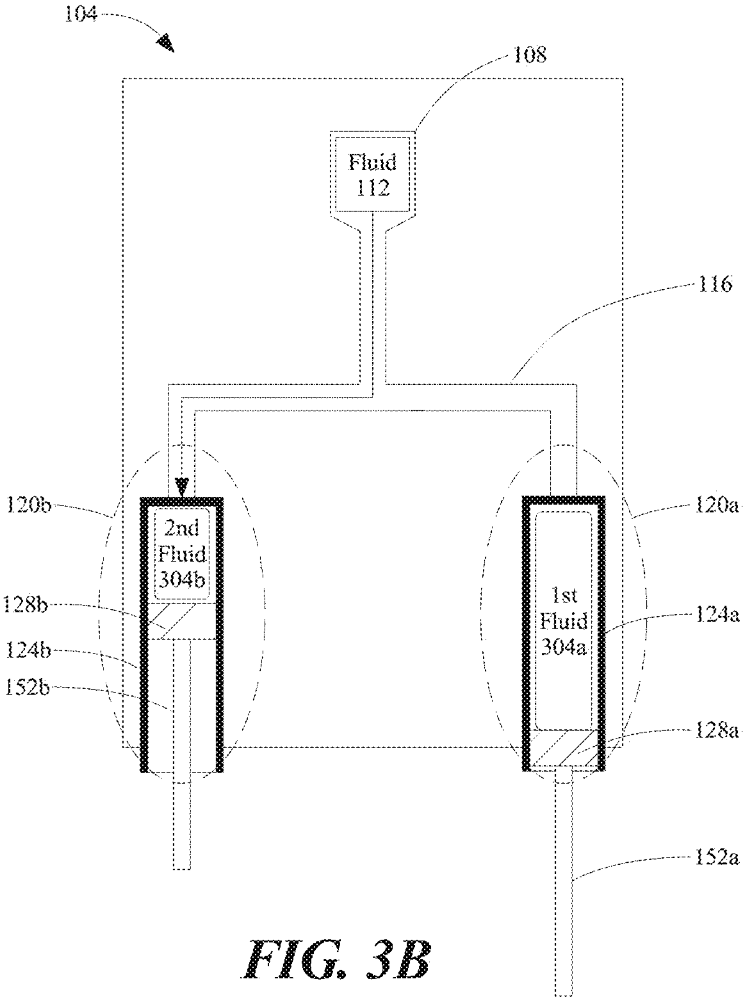
Figure 3C:
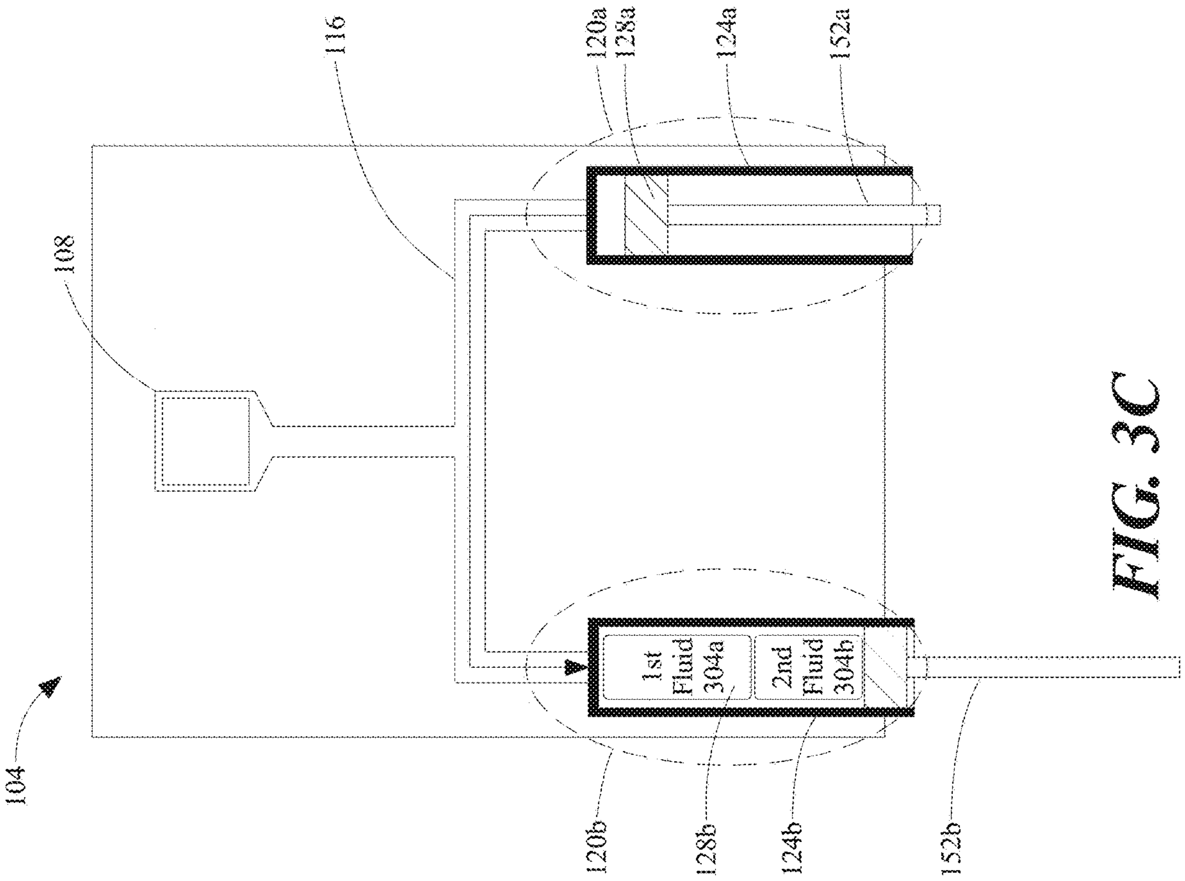

Now referring to FIGS. 3A-C, an exemplary utilization of one active flow component of plurality of active flow components as a reservoir, a fluid isolator, and a fluid incubator is illustrated. In some cases, partition created by barrel 124*a/b* and plunger 128*a/b* of active flow component 120*a/b* may serve as a reservoir to contain at least a fluid 112. Volume of such reservoir may be varied based on the position of plunger 128*a/b* within barrel 124*a/b*. In a non-liming example, as shown in FIG. 3A, first active flow component 120*a* may draw at least a fluid 112 from at least a reservoir 108 using the pull regime. The further plunger 128*a* is away from the inlet/outlet of first active flow component 120*a*, the more fluid first active flow component 120*a* may contain. When needed, fluid contained in first active flow component 120*a* may be released with push regime.

Still referring to FIGS. 3A-C, in some cases, plurality of active flow components may act as a fluid isolator configured to separate a plurality of different fluids from each other. Each active flow component of plurality of active flow components may be configured to contain a different fluid. In a non-limiting example, as shown in FIG. 3B, at least two active flow components 120*a-b* may work asynchronously to collect isolated fluids. At least a fluid 112 may be isolated into a first fluid 304*a* and a second fluid 304*b*. In an embodiment, at least a fluid 112 may be isolated as described in U.S. patent application Ser. No. 18/199,171, filed on May 18, 2023. First active flow component 120*a* may draw first fluid 304*a* from at least a reservoir 108 using the pull regime of first active flow component 120*a* and second active flow component 120*b* may subsequently draw second fluid 304*b* from at least a reservoir 108 using the pull regime of second active flow component 120*b*, wherein first fluid 304*a* may be stored within barrel 124*a* of first active flow component 120*a* and second fluid 304*b* may be stored within barrel 124*b* of second active flow component 120*b* after the isolation of at least a fluid 112.

Still referring to FIGS. 3A-C, in some cases, plurality of active flow components may act as a fluid incubator that provides a controlled environment for fluid incubation (i.e., growth and development of cells or microorganisms in a liquid medium). In a non-limiting example, as shown in FIG. 3C, fluids may be transferred between at least two active flow components 120*a-b*. first fluid 304*a* may be transferred through plurality of microfluidic channels, by first active flow component 120*a*, to second active flow component 120*b* as a function of the push regime, wherein the second active flow component 120*b* (e.g., barrel 124*b*) may be configured to maintain a stable temperature, humidity, and/or other environmental factors necessary for optimal growth and reproduction of cells or microorganisms.

Figure 4A:
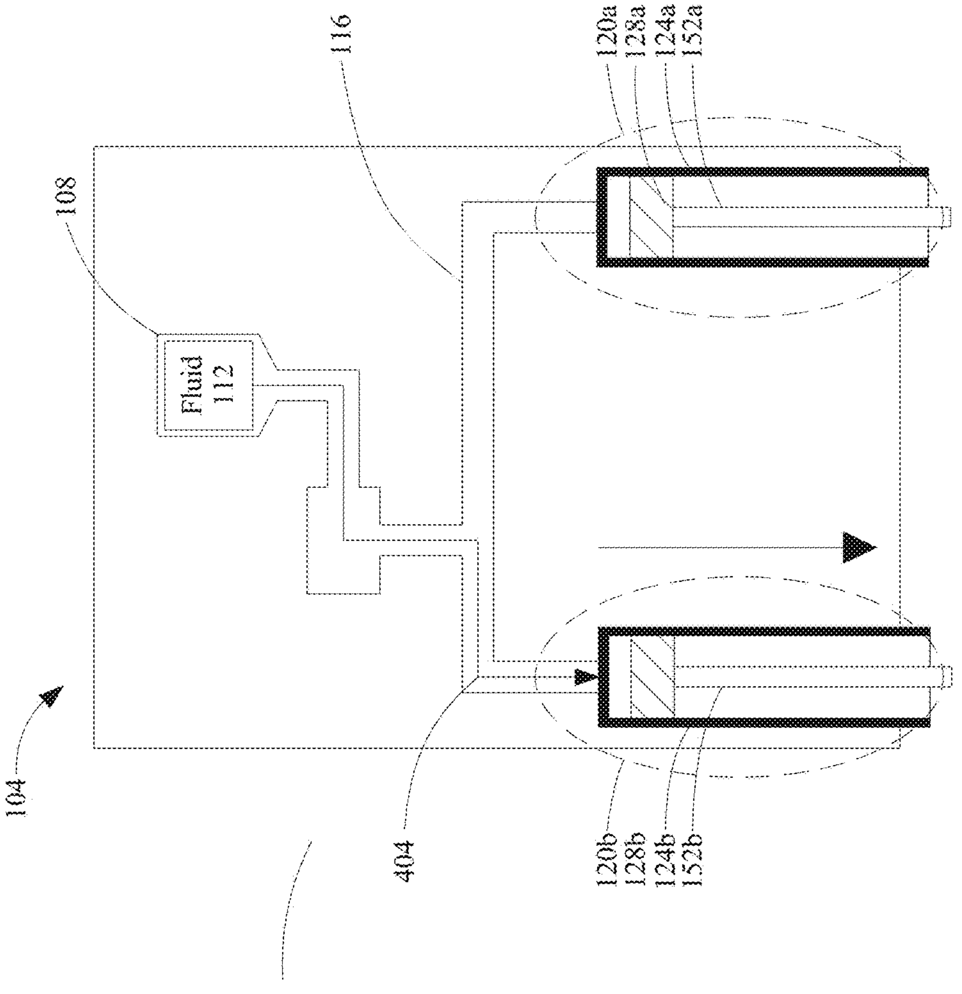
FIGS. 4A-B are diagrams showing an exemplary embodiment of utilizing a double syringe synchronization for alternative path creation.
Figure 4B:
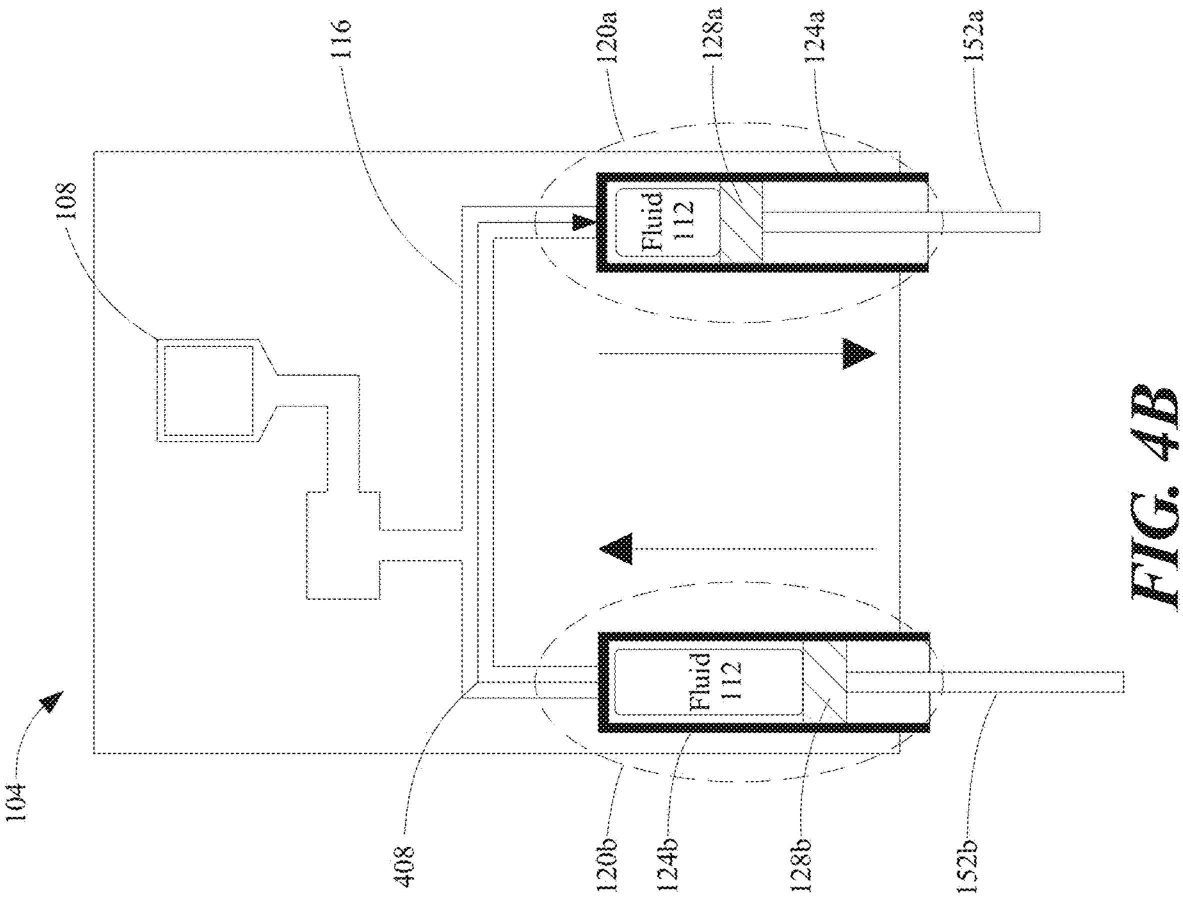

Now referring to FIGS. 4A-B, an exemplary embodiment of utilizing a double active flow components synchronization for alternative fluid flow path creation is illustrated. At least two active flow components 120*a-b* may work synchronously to flow at least a fluid 112 within plurality of microfluidic channels. In a non-limiting example, either first active flow component 120*a* or second active flow component 120*b* of at least two active flow component 120*a-b* may create a fluid flow path 404 by initiating plurality of active flow processes as described above. For instance, and without limitation, fluid flow path 404 may include a path for at least a fluid 112 to flow from at least a reservoir 108 to either first active flow component 120*a* or second active flow component 120*b*, whichever is activated. The flow of at least a fluid 112 may be directed to an alternative fluid flow path 408 to fluid flow path 404, by inversely actuating (i.e., operating at least two active flow components in different operation mode), using at least two actuator 144*a-b*, on both first active flow component 120*a* and second active flow component 120*b* and therefore controlling pressure differential; therefore, inverse actuation of at least two active flow component 120*a-b* may allow for multiple fluid flow path creation.

Figure 5A:
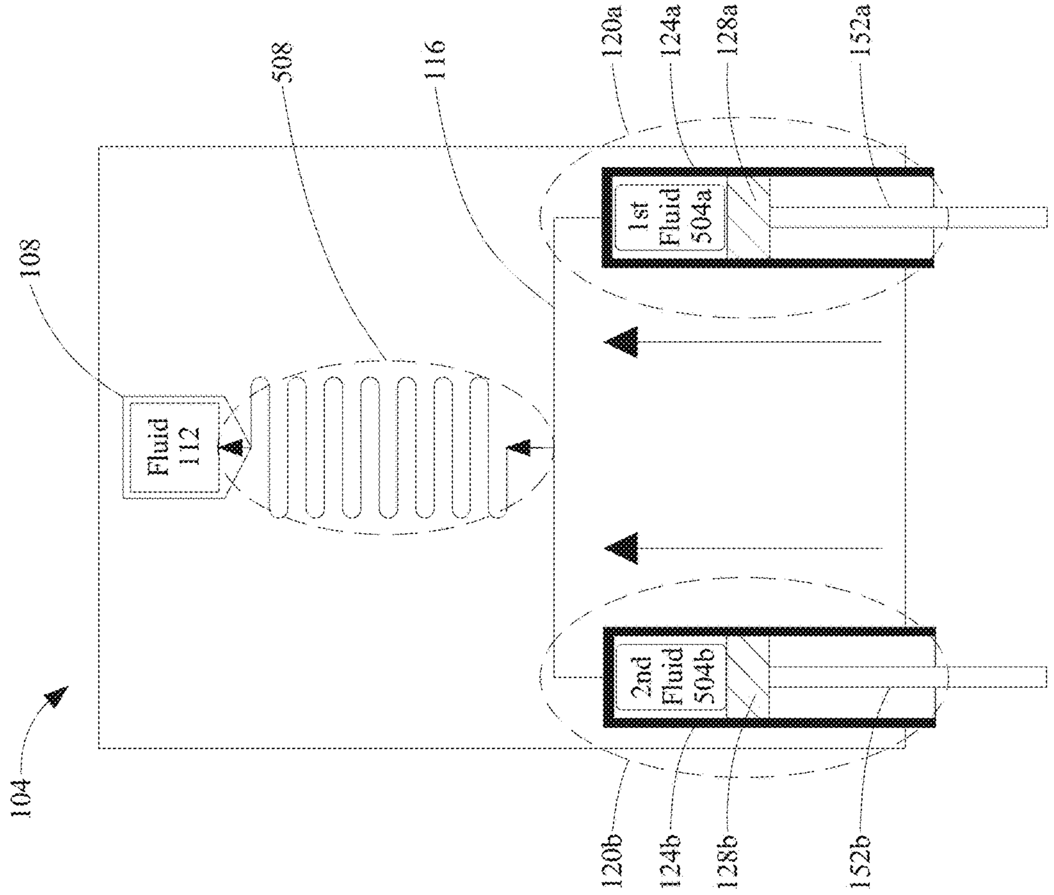
FIGS. 5A-C are diagrams illustrating the use of a mixing structure, a passive flow component, and a waste reservoir.
Figure 5B:
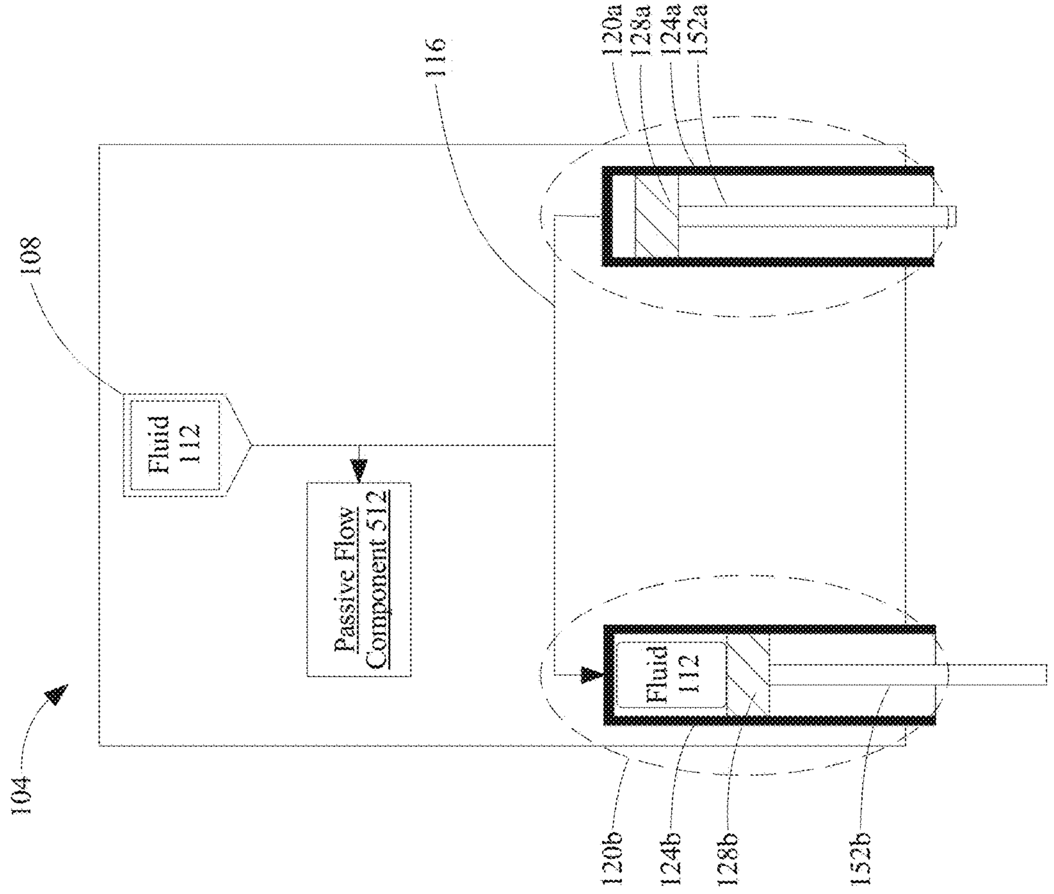
Figure 5C:
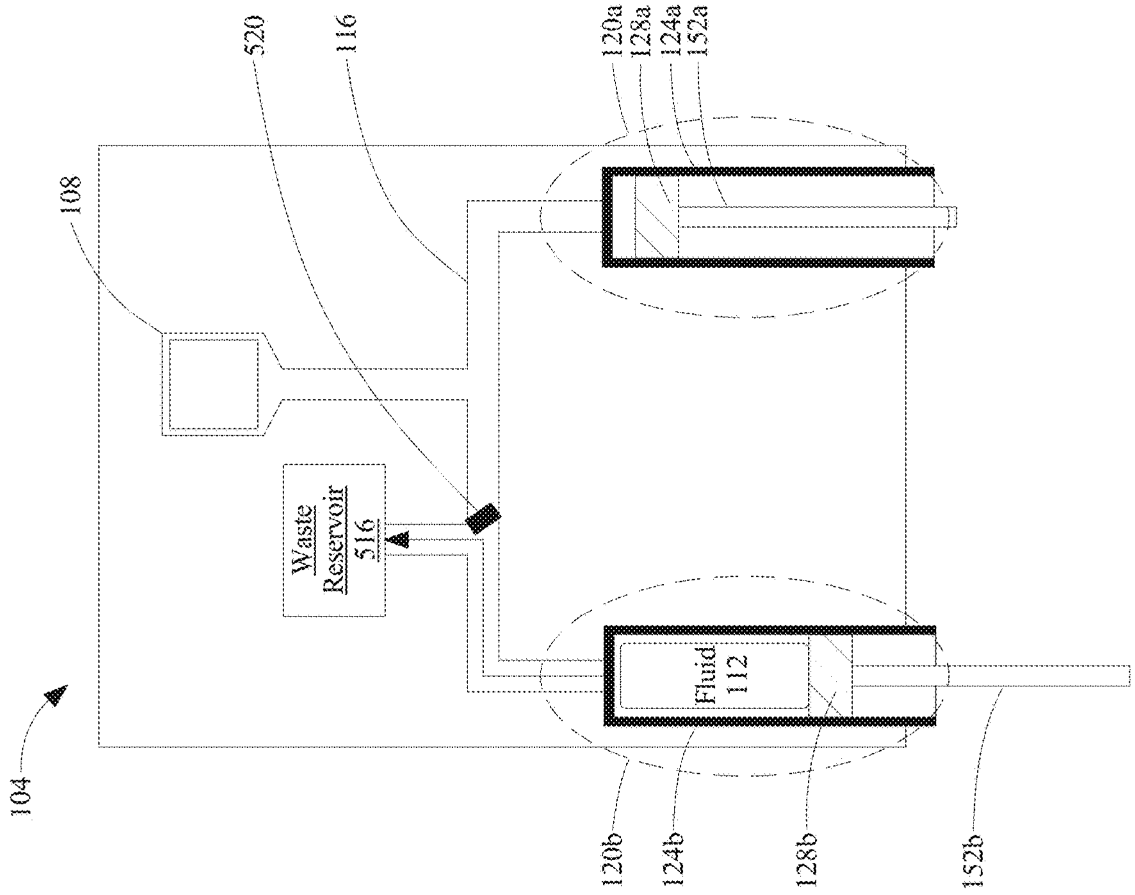

Now referring to FIGS. 5A-C, use of a mixing structure, a passive flow component, and a waste reservoir are illustrated. Initiating a plurality of active flow processes may include actuating the push regime using at least two actuators 144*a-b* connected to at least two active flow components 120*a-b* and mixing a first fluid 504*a* stored in first active flow component 120*a* with a second fluid 504*b* store in second active flow component 120*b*. Plurality of microfluidic features of microfluidic device 104 may include a mixing structure 508 (as shown in FIG. 5A) configured to host a such fluid mixing event initiated via the synchronization of at least two active flow components 120*a-b*. As used in this disclosure, a "mixing structure" is a microfluidic feature integrated within microfluidic device 104 that facilitates the efficient mixing of fluids. In some cases, mixing structure may be used in microfluidic device 104 to combine different fluids, such as reagents, samples, or buffers, to enable chemical or biological reactions or to create concentration gradients. In a non-limiting example, both first active flow component 120*a* and second active flow component 120*b* may be activated synchronously, flow both first fluid 504*a* and second fluid 504*b* in a forward direction through mixing structure 508 using push regime of both first active flow component 120*a* and second active flow component 120*b* at the same time. Mixing structure 504 may include a plurality of serpentine channels, wherein the plurality of serpentine channels are a series of curves or zigzag patterns that causes the fluid stream (i.e., first fluid 504*a* and second fluid 504*b*) to repeatedly change direction, promoting diffusion and mixing at the fluid interfaces. For example, and without limitation, serpentine channels may be consistent with any serpentine as described in U.S. patent application Ser. No. 18/121,712.

Still referring to FIGS. 5A-C, apparatus 100 may further include a passive flow component 512 in addition to at least two active flow components 120*a-b* for driving the flow of fluid within microfluidic environment. As used in this disclosure, a "passive flow component" is a component, typically of a microfluidic device, that imparts a passive flow on a fluid, wherein the "passive flow," for the purpose of this disclosure, is flow of the fluid, which is induced absent any external actuators, fields, or power sources. In a non-limiting example, passive flow component 512 may be integrated into microfluidic device 104, connected to plurality of microfluidic features. Passive flow component 512 may be configured to initiate a passive flow process on at least a fluid 112 in addition to plurality of active flow process. A "passive flow process," as described herein, is an action or step taken on passive flow component 512 in order to impart a passive flow on at least a fluid. Passive flow component 512 may be configured to flow at least a fluid 112 unidirectionally (i.e., in a direction towards passive flow component 512) through at least a sensor device 132 as a function of passive flow process. In an embodiment, passive flow component 512 may employ one or more passive flow techniques in order to initiate passive flow process; for instance, and without limitation, passive flow techniques may include osmosis, capillary action, surface tension, pressure, gravity-driven flow, hydrostatic flow, vacuums, and the like. In a non-limiting example, passive flow component may be in fluidic communication with at least a reservoir 108 and may be consistent with any passive flow component described in U.S. patent application Ser. No. 17/859,932.

In one embodiment, and still referring to FIGS. 5A-C, passive flow component 512 may include a capillary pump. As used in this disclosure, a "capillary pump" is a component that operates without any external power source and relies on capillary action to move at least a fluid 112 in fluidic communication with the capillary pump. "Capillary action," for the purpose of this disclosure, is a phenomenon that occurs when a liquid such as, without limitation, at least a fluid 112, in contact with a solid surface such as, without limitation, sensor interface including a porous membrane (i.e., a material such as a nitrocellulose, paper, or glass fiber with a plurality of voids that promotes a capillary flow.), and is able to move against gravity due to the combined effects of adhesive and cohesive forces. In a non-limiting example, passive flow process may be initiated as a function of such capillary action. In a non-limiting example, a surface of at least a sensor device 132 may be modified with hydrophilic chemistry, for instance by way of silanes, proteins, or another treatment (or may already be hydrophilic) in the sensing region. For example, and without limitation, at least a sensor device 132 and sensor interfaces may be configured such that liquid wicks from a porous membrane to a surface of at least a sensor device 132 as it flows through the membrane (e.g., at least a fluid 112 may be drawn into the pores of the porous membrane due to capillary action).

With further reference to FIGS. 5A-C, plurality of microfluidic features may further include a waste reservoir 516. As used in this disclosure, a "waste reservoir" is a designated compartment or container within microfluidic device 104 configured to collect and store waste fluids 520 (i.e., reagents, samples, or buffers that have already interacted or reacted within microfluidic device and are no longer needed for further processing or analysis) after they have been used in an assay, reaction, or any processing step as described in this disclosure. In a non-limiting example, as shown in FIG. 5C, microfluidic channel connected with waste reservoir 516 may be closed by microfluidic flow regulator such as an active valve as described above to prevent fluid from entering waste reservoir 516 before or during the assay. Second active flow component 120*b* may be configured to flow waste fluid 520 using the push regime to waste reservoir 516 after assay ends and the active valve 520 is open. Active valve 520 may include any active valve as described.

Figure 6:
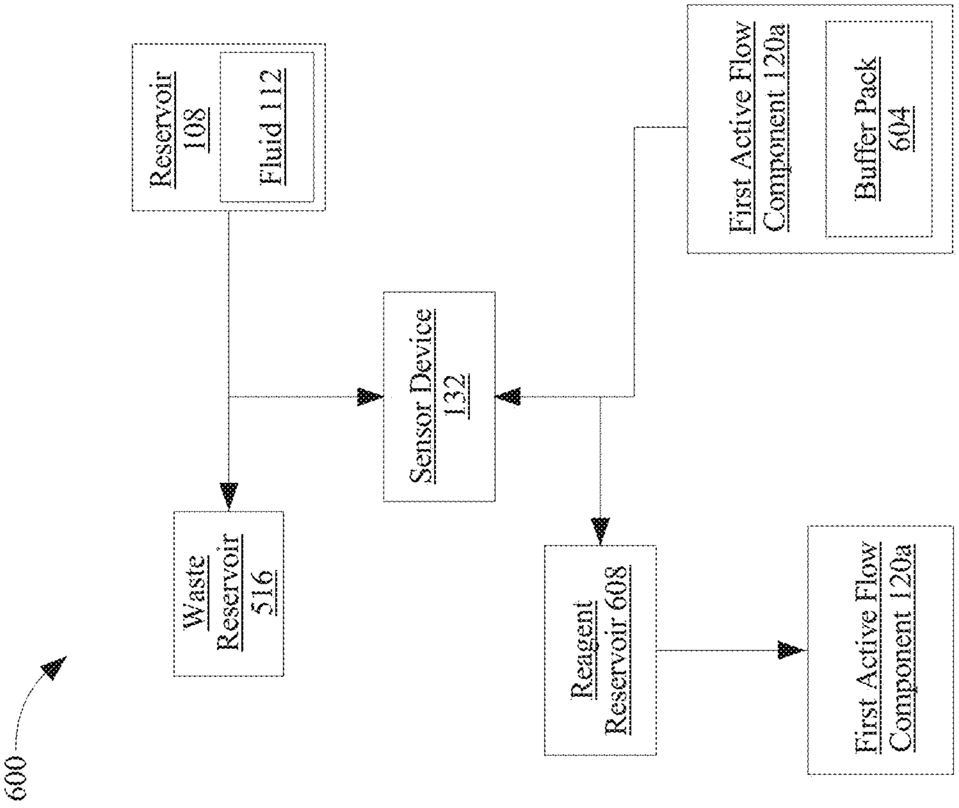
FIG. 6 is a diagram illustrating an exemplary embodiment of an applied assay with controlled flow in a microfluidic device with two active flow components.

Now referring to FIG. 6, an exemplary embodiment of an applied assay 600 with controlled flow in a microfluidic device 104 with two active flow components 120*a-b* is illustrated. First active flow component 120*a* may act as a sample driver while second active component 120*b* may contain a buffer pack 604 (containing buffer fluid such as, without limitation, PB S/EDTA/Tween-20 buffer). In this nonlimiting embodiment one possible assay workflow may be as follows: 1) at least a reservoir 108 may be sealed (for example, and without limitation, with a sticker that the user will need to peel off). 2) When microfluidic device 104 is plugged into external device 136, plunger 128*b* of second active flow component 120*b* may be pushed forward by external device 136, particularly at least a mechanical interface 148 connected to at least two actuator 144*a-b* (not shown), breaking the buffer pack 604, and flowing the buffer fluid within the buffer pack over at least a sensor device 132 into waste reservoir 516. 3) User of apparatus 100 may open a seal at reservoir 108 and input the sample (at least a fluid 112). 4) First active flow component 120*a* may be configured to operate under first operation mode to pull the sample over the at least a sensor device 132 for label free binding of target analyte, picking up the reagent (e.g., detection reagent bead or dried reagent) from a reagent reservoir 608 and then mixing it in barrel 124*a*. 5) First active flow component 120*a* may then be configured to operate under second operation mode to push the sample with detection reagent over at least a sensor device 132 for a final labeled detection binding step.

Figure 7:
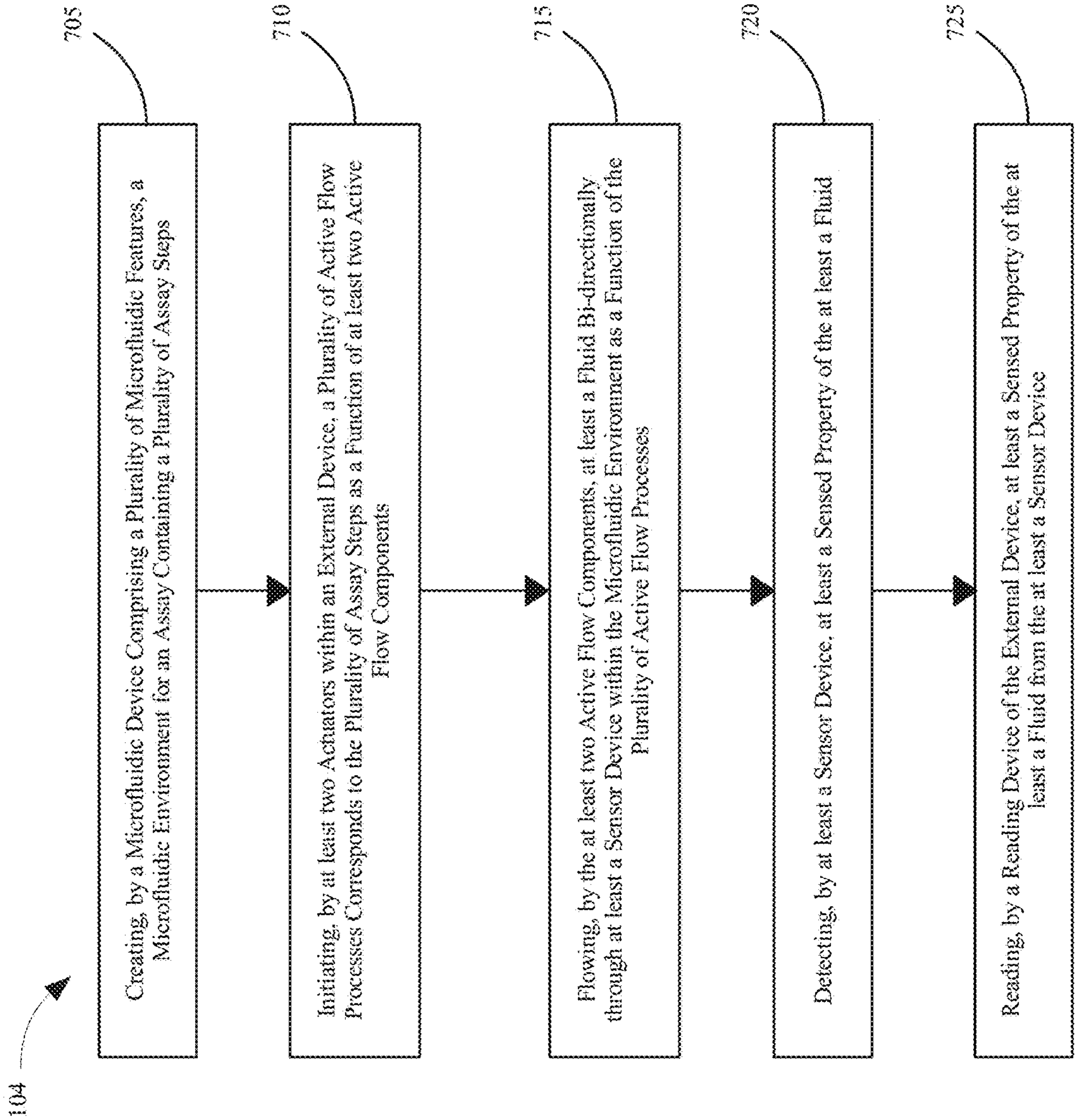
FIG. 7 is a flow diagram illustrating an exemplary method for controlling assay steps within an assay using a plurality of active flow components.

Now referring to FIG. 7, an exemplary method 700 for controlling assay steps within an assay using a plurality of active flow components is illustrated. Method 700 includes a step 705 of creating, by a microfluidic device including a plurality of microfluidic features, a microfluidic environment for an assay containing a plurality of assay steps, wherein the plurality of microfluidic features includes at least a reservoir configured to contain at least a fluid and a plurality of microfluidic channels connected to the at least a reservoir. In some embodiments, the plurality of microfluidic features may include a microfluidic flow regulator. This may be implemented, without limitation, as described with reference to FIGS. 1-6.

With continued reference to FIG. 7, method 700 includes a step 710 of initiating, by at least two actuators within an external device, a plurality of active flow processes corresponds to the plurality of assay steps as a function of at least two active flow components fluidically connected to the plurality of microfluidic features, wherein the at least two actuators are connected to the at least two active flow components using at least a mechanical interface, and the external device is connected to the microfluidic device using at least an alignment feature. In some embodiments, each active flow component of the at least two active flow components may include a barrel and a plunger within the barrel. In some embodiments, the alignment feature may include a multi-fiber push connector (MPO). In some embodiments, the at least a mechanical interface may include a multiple plunger grabbing mechanism. In some embodiments, each actuator of the at least two actuator comprises a linear actuator. This may be implemented, without limitation, as described with reference to FIGS. 1-6.

With continued reference to FIG. 7, method 700 includes a step 715 of flowing, by the at least two active flow components, the at least a fluid bi-directionally through at least a sensor device within the microfluidic environment as a function of the plurality of active flow process. In some embodiments, each active flow component of the at least two active flow components may include a first operation mode including a pull regime, wherein the active flow component is configured to flow the at least a fluid in a first direction within the microfluidic environment under the first operation mode, and a second operation mode including a push regime, wherein the active flow component is configured to flow the at least a fluid in a second direction within the microfluidic environment under the second operation mode, wherein the first direction is a direction towards the active flow component, and the second direction is a direction towards the at least a reservoir. In some embodiments, initiating a plurality of active flow processes corresponds to the plurality of assay steps may include actuating the pull regime using a first actuator connected to a first active flow component, actuating the push regime using a second actuator connected to a second active flow component, and creating a fluid flow path within the microfluidic environment for the at least a fluid. In other embodiments, initiating the plurality of active flow processes corresponds to the plurality of assay steps includes actuating the push regime using the at least two actuator connected to the at least two active flow components and mixing a first fluid stored in a first active flow component with a second fluid stored in the second active flow component within the microfluidic environment. This may be implemented, without limitation, as described with reference to FIGS. 1-6.

With continued reference to FIG. 7, method 700 includes a step 720 of detecting, by the at least a sensor device, at least a sensed property of the at least a fluid. This may be implemented, without limitation, as described with reference to FIGS. 1-6.

With continued reference to FIG. 7, method 700 includes a step 725 of reading, by a reading device of the external device, the at least a sensed property of the at least a fluid from the at least a sensor device. This may be implemented, without limitation, as described with reference to FIGS. 1-6.

With continued reference to FIG. 7, method 700 may include a step of flowing, by a passive flow component, the at least a fluid unidirectionally through the at least a sensor device within the microfluidic environment as a function of a passive flow process. This may be implemented, without limitation, as described with reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
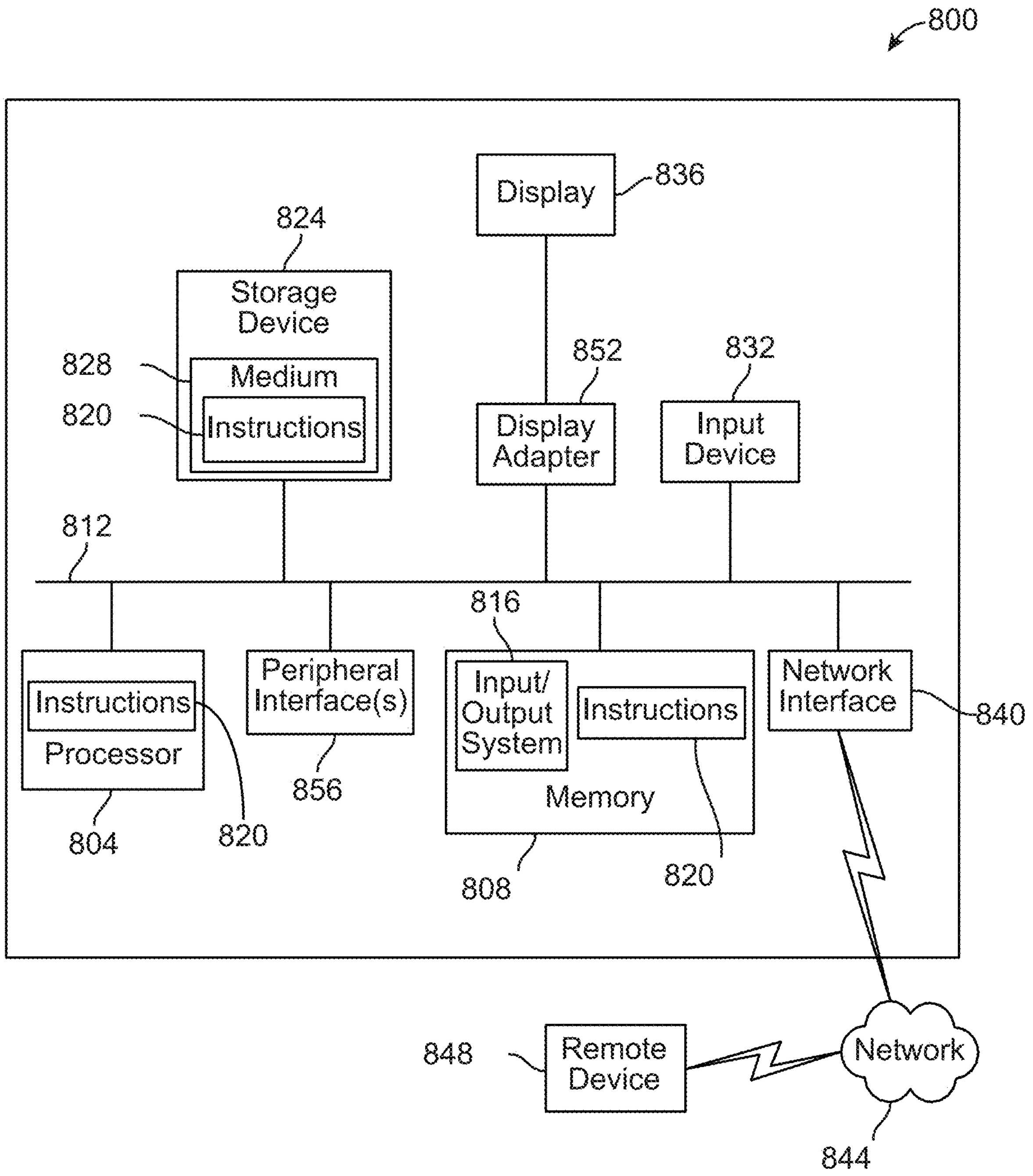
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve apparatuses, methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for controlling assay steps within an assay using a plurality of active flow components, the apparatus comprises:

- a microfluidic device comprising a plurality of microfluidic features, wherein the plurality of microfluidic features comprises:
  - at least a reservoir configured to contain at least a fluid; and
  - a plurality of microfluidic channels connected to the at least a reservoir, wherein the plurality of microfluidic channels is configured to:
    - create a microfluidic environment for an assay comprising a plurality of assay steps;
- at least two active flow components fluidically connected to the plurality of microfluidic features, wherein each active flow component includes a pump configured to convert mechanical power into fluidic energy;
- at least an optical sensor, wherein the at least an optical sensor comprises a sensor waveguide and is configured to:
  - be in sensed communication with the at least a fluid; and
  - detect at least a sensed property of the at least a fluid; and
- an external computing device connected to the microfluidic device using at least an alignment feature, wherein the external computing device comprises:
  - at least two actuators, wherein each actuator of the at least two actuators is a device configured to supply mechanical power to an active flow component of the at least two active flow components and the at least two actuators are configured to:

connect the at least two active flow components using at least a mechanical interface; and initiate a plurality of active flow processes corresponds to the plurality of assay steps as a function of the at least two active flow components; and at least an optical reading device comprising a reading device waveguide communicatively connected to the sensor waveguide using an optical connector, wherein the at least an optical reading device is configured to:

read the at least a sensed property of the at least a fluid from the at least an optical sensor;

wherein the at least two active flow components are configured to:

flow the at least a fluid bi-directionally through the at least an optical sensor within the microfluidic environment as a function of the plurality of active flow processes.

2. The apparatus of claim 1, wherein the plurality of microfluidic features comprises a microfluidic flow regulator.

3. The apparatus of claim 1, wherein each active flow component of the at least two active flow components comprise a barrel and a plunger within the barrel.

4. The apparatus of claim 1, wherein the optical connector comprises a multi-fiber push connector (MPO).

5. The apparatus of claim 1, wherein the at least a mechanical interface comprises a multiple plunger grabbing mechanism.

6. The apparatus of claim 1, wherein each actuator of the at least two actuators comprises a linear actuator.

7. The apparatus of claim 1, wherein each active flow component of the at least two active flow components comprise:

a first operation mode comprising a pull regime, wherein the active flow component is configured to flow the at least a fluid in a first direction within the microfluidic environment under the first operation mode; and a second operation mode comprising a push regime, wherein the active flow component is configured to flow the at least a fluid in a second direction within the microfluidic environment under the second operation mode;

wherein:

the first direction is a direction towards the active flow component; and the second direction is a direction towards the at least a reservoir.

8. The apparatus of claim 7, wherein initiating the plurality of active flow processes corresponds to the plurality of assay steps comprises:

actuating the pull regime using a first actuator connected to a first active flow component;

actuating the push regime using a second actuator connected to a second active flow component; and creating a fluid flow path within the microfluidic environment for the at least a fluid.

9. The apparatus of claim 7, wherein initiating the plurality of active flow processes corresponds to the plurality of assay steps comprises:

actuating the push regime using the at least two actuators connected to the at least two active flow components; and mixing a first fluid stored in a first active flow component with a second fluid stored in the second active flow component.

10. The apparatus of claim 1, wherein the apparatus further comprises:

a passive flow component comprising a capillary pump, the passive flow component configured to flow the at least a fluid unidirectionally through the at least a sensor device within the microfluidic environment as a function of a passive flow process.

11. A method for controlling assay steps within an assay using a plurality of active flow components, the method comprises:

creating, by a microfluidic device comprising a plurality of microfluidic features, a microfluidic environment for an assay containing a plurality of assay steps, wherein the plurality of microfluidic features comprises:

at least a reservoir configured to contain at least a fluid; and a plurality of microfluidic channels connected to the at least a reservoir;

initiating, by at least two actuators within an external computing device, a plurality of active flow processes corresponds to the plurality of assay steps as a function of at least two active flow components fluidically connected to the plurality of microfluidic features, wherein:

the at least two actuators are connected to the at least two active flow components using at least a mechanical interface;

each actuator of the at least two actuators is a device configured to supply mechanical power to an active flow component of the at least two active flow components;

each active flow component includes a pump configured to convert mechanical power into fluidic energy; and the external device is connected to the microfluidic device using at least an alignment feature;

flowing, by the at least two active flow components, the at least a fluid bi-directionally through at least an optical sensor comprising a sensor waveguide within the microfluidic environment as a function of the plurality of active flow process;

detecting, by the at least an optical sensor, at least a sensed property of the at least a fluid; and reading, by an optical reading device of the external computing device, the at least a sensed property of the at least a fluid from the at least an optical sensor, wherein the optical reading device further comprises a reader waveguide connected to the sensor waveguide using at least an optical connector.

12. The method of claim 11, wherein the plurality of microfluidic features comprises a microfluidic flow regulator.

13. The method of claim 11, wherein each active flow component of the at least two active flow components comprise a barrel and a plunger within the barrel.

14. The method of claim 11, wherein the at least an optical connector comprises a multi-fiber push connector (MPO).

15. The method of claim 11, wherein the at least a mechanical interface comprises a multiple plunger grabbing mechanism.

16. The method of claim 11, wherein each actuator of the at least two actuators comprises a linear actuator.

17. The method of claim 11, wherein each active flow component of the at least two active flow components comprise:

a first operation mode comprising a pull regime, wherein the active flow component is configured to flow the at least a fluid in a first direction within the microfluidic environment under the first operation mode; and a second operation mode comprising a push regime, wherein the active flow component is configured to flow the at least a fluid in a second direction within the microfluidic environment under the second operation mode;

wherein:

the first direction is a direction towards the active flow component; and the second direction is a direction towards the at least a reservoir.

18. The method of claim 17, wherein initiating the plurality of active flow processes corresponds to the plurality of assay steps comprises:

actuating the pull regime using a first actuator connected to a first active flow component;

actuating the push regime using a second actuator connected to a second active flow component; and creating a fluid flow path within the microfluidic environment for the at least a fluid.

19. The method of claim 17, wherein initiating the plurality of active flow processes corresponds to the plurality of assay steps comprises:

actuating the push regime using the at least two actuators connected to the at least two active flow components; and mixing a first fluid stored in a first active flow component with a second fluid stored in the second active flow component within the microfluidic environment.

20. The method of claim 11, wherein the method further comprises:

flowing, by a passive flow component comprising a capillary pump, the at least a fluid unidirectionally through the at least a sensor device within the microfluidic environment as a function of a passive flow process.

* * * * *